US008595378B1

(12) United States Patent
Cohn et al.

(10) Patent No.: US 8,595,378 B1
(45) Date of Patent: Nov. 26, 2013

(54) MANAGING COMMUNICATIONS HAVING MULTIPLE ALTERNATIVE DESTINATIONS

(75) Inventors: Daniel T. Cohn, Seattle, WA (US); Eric Jason Brandwine, Haymarket, VA (US); Aaron C. Thompson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 700 days.

(21) Appl. No.: 12/414,253

(22) Filed: Mar. 30, 2009

(51) Int. Cl.
*G06F 15/173* (2006.01)

(52) U.S. Cl.
USPC ............................ 709/238; 709/239; 709/240

(58) Field of Classification Search
USPC .......................................... 709/238; 379/219
See application file for complete search history.

(56) References Cited

U.S. PATENT DOCUMENTS

| 2007/0061441 | A1 | 3/2007 | Landis et al. |
| 2007/0280243 | A1 | 12/2007 | Wray et al. |
| 2008/0225875 | A1 | 9/2008 | Wray et al. |
| 2008/0240122 | A1 | 10/2008 | Richardson et al. |
| 2009/0003353 | A1 | 1/2009 | Ding et al. |
| 2009/0046733 | A1 | 2/2009 | Bueno et al. |

OTHER PUBLICATIONS

Animesh Nandi, LALA: Location Aware Load Aware Overlay Anycast, Master's Thesis, Rice University, Houston, Texas, Apr. 2004.*
Rong Cheng; Hai Jin; Ke Shi; Bin Cheng; , "An anycast-based P2P routing protocol for mobile ad hoc networks," Internet, 2005.The First IEEE and IFIP International Conference in Central Asia on , vol., no., pp. 5 pp., Sep. 26-29, 2005.*
Partridge, Mendez & Milliken, RFC 1546, Host Anycasting Service, Nov. 1993 (available at http://www.ietf.org/rfc/rfc1546.txt).*
"Anycast," retrieved on Mar. 16, 2009, from http://en.wikipedia.org/wiki/Anycast, 4 pages.
"Load Balancing (Computing)," retrieved on Mar. 16, 2009, from http://en.wikipedia.org/wiki/Load_balancing_(computing), 5 pages.
"Mobile IP," retrieved on Dec. 19, 2008, from http://en.wikipedia.org/wiki/Mobile_ip, 3 pages.
"Round Robin DNS," retrieved on Dec. 17, 2008, from http://en.wikipedia.org/wiki/Round_robin_DNS, 2 pages.
"Virtual IP Address," retrieved on Dec. 17, 2008, from http://www.answers.com/topic/virtual-ip-address-1, 2 pages.
"VMware VMotion," retrieved on Mar. 16, 2009, from http://www.vmware.com/products/vi/vc/vmotion.html. 2 pages.

(Continued)

*Primary Examiner* — Umar Cheema
(74) *Attorney, Agent, or Firm* — Seed IP Law Group PLLC

(57) ABSTRACT

Techniques are described for managing communications between computing nodes of a computer network. In some situations, multiple computing nodes of a provided computer network may share a single virtual network address, and communications sent to that single virtual network address by other computing nodes may be managed in various manners. For example, the multiple computing nodes sharing the single virtual network address may be part of a pool of alternative destinations associated with the single virtual network address, and particular computing nodes from the pool may be selected to receive particular communications sent to the single virtual network address. Pools of multiple related computing nodes may also be identified and monitored in various manners. In some situations, the computing nodes may include virtual machine nodes hosted on one or more physical computing machines or systems, such as by or on behalf of one or more users.

29 Claims, 10 Drawing Sheets

(56) References Cited

OTHER PUBLICATIONS

"VMWare Storage VMotion," retrieved on Mar. 16, 2009, from http://www.vmware.com/products/vi/storage_vmotion.html. 2 pages.

Clark, C., et al. "Live Migration of Virtual Machines," retrieved on Mar. 16, 2009, from http://www.cl.cam.ac.uk/research/srg/netos/papers/2005-migration-nsdi-pre.pdf, 14 pages.

* cited by examiner

MANAGING COMMUNICATIONS HAVING MULTIPLE ALTERNATIVE DESTINATIONS

BACKGROUND

Many companies and other organizations operate computer networks that interconnect numerous computing systems to support their operations, with the computing systems alternatively co-located (e.g., as part of a private local network) or instead located in multiple distinct geographical locations (e.g., connected via one or more private or shared intermediate networks). For example, data centers housing significant numbers of interconnected computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

DETAILED DESCRIPTION

Figure 1:
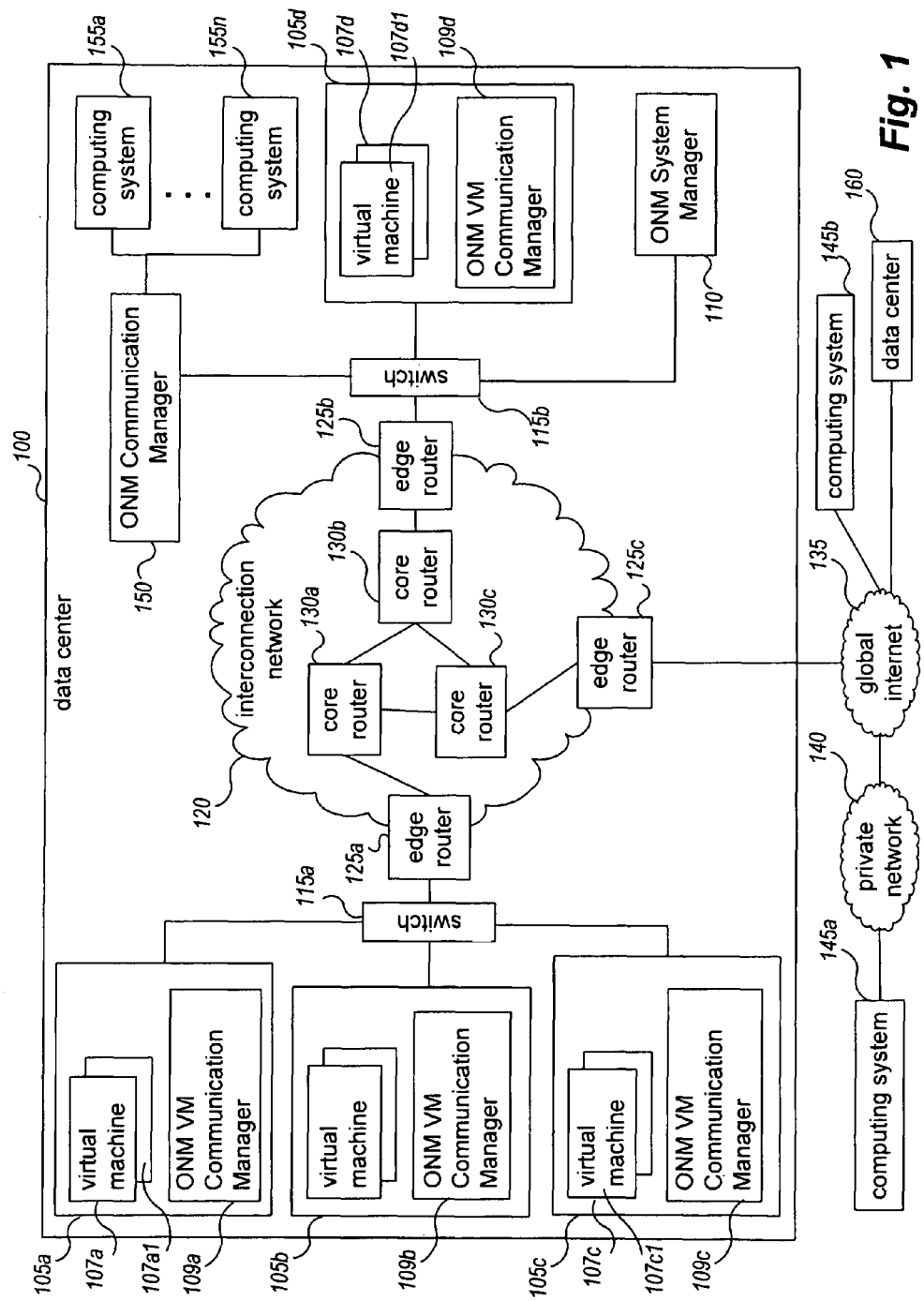
FIG. 1 is a network diagram illustrating an example embodiment of configuring and managing communications between computing nodes belonging to a virtual computer network.

Techniques are described for managing communications between computing nodes of a computer network, such as for virtual computer networks provided on behalf of users or other entities. In at least some embodiments, the techniques enable multiple computing nodes of a provided computer network to share a single virtual network address, and include managing communications sent to that single virtual network address by other computing nodes in various manners. For example, in at least some embodiments, the multiple computing nodes sharing the single virtual network address may be identified as being part of a pool of alternative destinations for communications sent to the single virtual network address, and particular computing nodes from the pool may be selected in various manners and at various times to receive particular communications sent to the single virtual network address by other computing nodes. Pools of multiple related computing nodes may also be identified and monitored in various manners in various embodiments, and may be used to provide various benefits. Additional details regarding the use of pools of multiple related computing nodes are included below. In addition, in at least some embodiments, some or all of the described techniques are automatically performed by embodiments of an Overlay Network Manager system.

A virtual local network or other virtual computer network between multiple computing nodes may be provided in various ways in various embodiments, such as by creating an overlay network using one or more intermediate physical networks that separate the multiple computing nodes. In such embodiments, the intermediate physical network(s) may be used as a substrate network on which the overlay virtual computer network is provided, with messages between computing nodes of the overlay virtual computer network being passed over the intermediate physical network(s), but with the computing nodes being unaware of the existence and use of the intermediate physical network(s) in at least some such embodiments. For example, the multiple computing nodes may each have a distinct physical substrate network address that corresponds to a location of the computing node within the intermediate physical network(s), such as a substrate IP ("Internet Protocol") network address (e.g., an IP network address that is specified in accordance with IPv4, or "Internet Protocol version 4," or in accordance with IPv6, or "Internet Protocol version 6," such as to reflect the networking protocol used by the intermediate physical networks). In other embodiments, a substrate network on which a virtual computer network is overlaid may itself include or be composed of one or more other virtual computer networks, such as other virtual computer networks implemented by one or more third parties (e.g., by an operator or provider of Internet or telecom infrastructure).

When computing nodes are selected to participate in a virtual computer network being provided by the Overlay Network Manager system and being overlaid on a substrate network, each computing node may be assigned one or more virtual network addresses for the provided virtual computer network that are unrelated to those computing nodes' substrate network addresses, such as from a range of virtual network addresses used for the provided virtual computer network—in addition, in at least some embodiments and situations, a virtual computer network being provided may further use a networking protocol that is different from the networking protocol used by the substrate network (e.g., with the virtual computer network using the IPv4 networking protocol, and the substrate computer network using the IPv6 networking protocol). The computing nodes of the virtual computer network inter-communicate using the virtual network addresses (e.g., by sending a communication to another destination computing node by specifying that destination computing node's virtual network address as the destination network address for the communication), but the substrate network may be configured to route or otherwise forward communications based on substrate network addresses (e.g., by physical network router devices and other physical networking devices of the substrate network). If so, the overlay virtual computer network may be implemented from the edge of the intermediate physical network(s), by modifying the communications that enter the intermediate physical network(s) to use substrate network addresses that are based on the networking protocol of the substrate network, and by modifying the communications that leave the intermediate physical network(s) to use virtual network addresses that are based on the networking protocol of the virtual computer network. Additional details related to the provision of such an overlay virtual computer network are included below.

In at least some embodiments, an embodiment of an Overlay Network Manager ("ONM") system provides overlay virtual computer networks to customers and other users, such as by providing and using numerous computing nodes that are in one or more geographical locations (e.g., in one or more data centers) and that are inter-connected via one or more intermediate physical networks. The ONM system may use various communication manager modules at the edge of the one or more intermediate physical networks to manage communications for the various overlay virtual computer networks as they enter and leave the intermediate physical network(s), and may use one or more system manager modules to coordinate other operations of the ONM system. For example, to enable the communication manager modules to manage communications for the overlay virtual computer networks being provided, the ONM system may track and use various information about the computing nodes of each virtual computer network, such as to map the substrate physical network address of each such computing node to the one or more overlay virtual network addresses associated with the computing node. Such mapping and other information may be stored and propagated in various manners in various embodiments, including centrally or in a distributed manner, as discussed in greater detail below.

Furthermore, in order to provide virtual computer networks to users and other entities in a desired manner, the ONM system allows users and other entities to interact with the ONM system in at least some embodiments to configure a variety of types of information for virtual computer networks that are provided by the ONM system on behalf of the users or other entities, and may track and use such configuration information as part of providing those virtual computer networks. The configuration information for a particular virtual computer network having multiple computing nodes may include, for example, one or more of the following non-exclusive list: a quantity of the multiple computing nodes to include as part of the virtual computer network; one or more particular computing nodes to include as part of the virtual computer network; a range or other group of multiple virtual network addresses to associate with the multiple computing nodes of the virtual computer network; logical network topology information for the virtual computer network, such as to specify multiple logical sub-networks that each include a subset of the multiple computing nodes and/or to specify one or more logical networking devices that are each associated with a specified group of the multiple computing nodes; particular virtual network addresses to associate with particular computing nodes or with particular groups of related computing nodes; a type of at least some of the multiple computing nodes of the virtual computer network, such as to reflect quantities and/or types of computing resources to be included with or otherwise available to the computing nodes; a geographic location at which some or all of the computing nodes of the virtual computer network are to be located; etc. In addition, the configuration information for a virtual computer network may be specified by a user or other entity in various manners in various embodiments, such as by an executing program of the user or other entity that interacts with an API ("application programming interface") provided by the ONM system for that purpose and/or by a user that interactively uses a GUI ("graphical user interface") provided by the ONM system for that purpose.

As previously noted, each computing node of a virtual computer network may be assigned one or more virtual network addresses for the provided virtual computer network, such that in at least some embodiments each computing node may have one or more unique virtual network addresses. In addition, in at least some embodiments, there may be one or more virtual network addresses of a provided virtual computer network that are each shared by a pool of multiple computing nodes of the virtual computer network, such as to allow the multiple computing nodes of a pool to act as alternative destinations for communications sent to the virtual network address associated with that pool. Such pools of multiple computing nodes may be defined in various manners in various embodiments. For example, a user or other entity may interact with the ONM system in at least some embodiments to configure various information about one or more such computing node pools for a particular virtual computer network, and the ONM system may track and use such computing node pool information as part of providing that virtual computer network. The computing node pool configuration information for a virtual computer network may include various types of information, including the following non-exclusive list: one or more virtual network addresses that are associated with each computing node pool, such that communications sent to one of the one or more virtual network addresses will be directed to at least one of the computing nodes of the pool; indications of particular computing nodes to be associated with a particular computing node pool; information regarding monitoring functionality that the ONM system is to provide for the computing nodes of a particular computing node pool; information regarding actions that the ONM system is to take if one or more of the computing nodes of a particular computing node pool become unavailable or satisfy one or more other specified criteria (e.g., actions to notify an indicated entity, actions to add a new computing node to the pool, etc.); information regarding factors to use for a particular computing node pool when selecting a particular computing node of the pool to receive particular communications sent to a virtual network address associated with the computing node pool; etc.

While users or other entities may interact with the ONM system to explicitly define and configure pools of multiple related computing nodes in some embodiments, such pools may also be identified in other manners in other embodiments. In particular, in at least some embodiments, the ONM system may automatically detect at least some pools of multiple related computing nodes for a particular virtual computer network, and then manage those detected computing node pools in a manner similar to that for user-specified computing node pools. For example, if a user or other entity configures particular computing nodes of a virtual computer network to use particular virtual network addresses (e.g., by directly interacting with those computing nodes to configure virtual network addresses used by those computing nodes, without explicitly notifying the ONM system of those configurations), the ONM system may automatically detect that multiple computing nodes of the virtual computer network are using a particular shared virtual network address, and optionally may automatically create a pool to represent those computing nodes. Such detection of computing nodes sharing a particular virtual network address may be performed in various manners in various embodiments, such as by the ONM system tracking virtual network addresses that individual computing nodes use (e.g., based on source network addresses used in communications sent by computing nodes, based on other types of network messages sent by computing nodes that include their network addresses, etc.), and then analyzing that information to detect when two or more computing nodes are using the same virtual network address. Information about the virtual network addresses that computing nodes use may also optionally be associated with other information that is tracked for those computing nodes (e.g., an associated substrate network address of a computing node, an associated virtual or non-virtual hardware address of the computing node, a geographical location of the computing node, a monitored status of the computing node, etc.).

Once a pool of multiple related computing nodes is automatically detected or otherwise identified, the pool may be used in various manners in various embodiments. For example, multiple related computing nodes of a pool may be configured to be alternative destinations for communications sent to a virtual network address associated with the pool, such as based on an explicit configuration performed by a user for the pool, or by default for an automatically detected pool. Such multiple alternative destination computing nodes may be used for various purposes, such as to provide load balancing and/or highly resilient availability among the various alternative destination computing nodes (e.g., to provide high resiliency by having alternative destination computing nodes to use if one or more of the alternative destination computing nodes fails or otherwise lacks an ability to respond to requests, such as due to high utilization or load, network unavailability, etc.)—as one example, a particular virtual network address may be associated with a network-accessible service that is available to at least some computing nodes of a virtual computer network, and multiple alternative destination computing nodes may be used to support that network-accessible service. In some embodiments and situations, the multiple alternative destination computing nodes for a particular pool may include one or more computing nodes at each of multiple distinct geographical locations (e.g., at multiple distinct data centers), while in other embodiments multiple alternative destination computing nodes for a particular pool may include multiple computing nodes at a single geographical location (e.g., a single data center). In other embodiments, the multiple related computing nodes of a particular pool may not represent alternative destinations, such as if some or all of the multiple related computing nodes are configured to receive some or all communications sent to a virtual network address associated with the pool, such as in a manner analogous to a multicast or broadcast.

The selection of one or more computing nodes from a pool to receive one or more particular communications sent to a virtual network address associated with the pool may be made at various times in various embodiments. For example, in some embodiments, a particular sending computing node may request information about an intended destination virtual network address before the sending computing node sends any communications to that virtual network address, such as part of an ARP ("Address Resolution Protocol") request or other address resolution request. In such situations, when the indicated virtual network address is associated with a pool, one or more computing nodes may be selected from the pool for that sending computing node, and information about those selected computing node(s) may be stored for the sending computing node and later used to direct some or all future communications from the sending computing node using that virtual network address to those selected computing node(s). In other embodiments and situations, information may be requested about the computing node(s) that correspond to an indicated virtual network address at other times, such as dynamically when a sending computing node initiates an outgoing communication to that virtual network address—in such situations, the one or more pool computing nodes selected for the request may be used only for that outgoing communication (such that future outgoing communications by that sending computing node to that virtual network address may initiate other such requests and possibly result in different pool computing nodes being selected), or instead information about those selected computing node(s) may be stored and also used for some or all future communications sent by that sending computing node using that virtual network address.

In addition, the selection of one or more computing nodes from a pool to receive one or more particular communications from a sending computing node may also be made in various manners in various embodiments. In particular, in at least some embodiments, information about the sending computing node and/or information about some or all of the computing nodes in the pool may be used to select one or more particular pool computing nodes to receive one or more communications from the sending computing node that are directed to a virtual network address associated with the pool. For example, if a particular pool is being used for load balancing purposes, one or more pool computing nodes may be selected based at least in part on a current load of those pool computing nodes (e.g., as determined by monitored status information from the ONM system, as described in greater detail below), such as to select one or more pool computing nodes that are currently least utilized. In addition, if it is desirable to minimize network traffic and/or communication latency, one or more pool computing nodes may be selected based at least in part on a relative geographical and/or network location of those pool computing nodes to the geographical and/or network location of the sending computing node (e.g., as tracked by the ONM system), such as to select one or more pool computing nodes that are "nearest" to the sending computing node in accordance with an indicated distance measure. In other embodiments, particular pool computing nodes may be selected in other manners, including as indicated in the following non-exclusive list: based on characteristics of one or more particular communications to be received by the selected pool computing node(s), such as a type of content of the communications, a size of the communications, a type of request included in the communications, etc.; based on one or more pool computing nodes previously selected for related prior communications, such as prior communications from the same sending computing node (e.g., so as to maintain a session or otherwise allow prior state information to be used, such as based on a cookie or other information included with a particular communication or other request), prior communications of a similar type, etc.; by consecutively selecting each pool computing node in a circular manner; in a random manner; etc.

As previously noted, the ONM system may also take various actions to monitor pools of related computing nodes in at least some embodiments, such as to track a current status of some or all of the computing nodes in such pools. For example, one or more modules of the ONM system may periodically contact some or all such pool computing nodes to determine status information for the pool computing nodes (e.g., to request information from a pool computing node regarding its current status and ability to handle additional requests, such as its current utilization, capacity, usage trends, etc.; to obtain information regarding whether a pool computing node is alive and responsive, such as based on ping messages sent to the pool computing node; etc.), or may otherwise track information about the current status of such pool computing nodes (e.g., by tracking the last time that each pool computing node has responded to a communication or otherwise sent a message over the virtual computer network; by receiving and analyzing information that is proactively provided by one or more computing nodes of a pool, such as if each pool computing node pushes status information about itself to the ONM system and/or if some or all pool computing nodes monitor the status of other computing nodes of the pool and report status information for those other computing nodes; etc.). In some embodiments, the ONM system may automatically perform such monitoring for some or all pools, while in other embodiments the ONM system may do so at the request of a user or other entity associated with an indicated pool or with particular pool computing nodes (e.g., as part of a fee-based request for information from the user or other entity).

In addition, the monitored status information for computing nodes of a pool may be used in various manners in various embodiments, including as indicated in the following non-exclusive list: to assist in selecting particular pool computing nodes for particular communications and/or for particular sending computing nodes, such as based on a current monitored status of the selected computing node(s); to notify a user or other entity of some or all monitored information, such as to indicate problems (e.g., the failure of a particular pool computing node, over-utilization or under-utilization of a particular pool computing node; etc.) or to provide overview status information; to automatically initiate actions when specified criteria are met, such as to add a new computing node to an identified pool if a previously existing computing node of the pool fails or otherwise becomes unable to handle additional requests, or to modify future selections of a particular pool computing node to reduce utilization of an over-utilized pool computing node or to increase utilization of an under-utilized pool computing node so as to reflect ability of the pool computing node to handle additional requests; to manage ongoing communications when a particular pool computing node fails or otherwise becomes unable to handle additional requests, such as to update information for sending computing nodes that have been communicating with the particular pool computing node so that they no longer do so; etc. In this manner, the computing nodes that are part of a particular pool may change at various times (e.g., when an associated entity adds and/or removes computing nodes from the pool, when a computing node that is part of the pool fails or becomes unavailable, when a new computing node begins using a virtual network address associated with the existing pool, etc.), and the ONM system manages communications for the pool accordingly.

Additional details related to managing communications sent to a virtual network address having an associated pool of multiple related computing nodes are included below.

In at least some embodiments, the computing nodes between which communications are managed may be physical computing systems and/or may be virtual machines that are each hosted on one or more physical computing systems, and the communications may include transmissions of data (e.g., messages, packets, frames, streams, etc.) in various formats. As previously noted, some or all computing nodes used for a particular provided overlay virtual computer network may in some embodiments be provided by the ONM system for use by users, while in other embodiments some or all such computing nodes may instead be provided by a user who uses those computing nodes. Furthermore, in at least some situations, an embodiment of the ONM system may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center). In at least some such embodiments, virtual computer networks to which computing nodes belong may be selected based on associated users, such as based on the computing nodes executing programs on behalf of a user or other entity. In addition, in some situations, an embodiment of the ONM system may be part of or otherwise affiliated with a configurable network service (or "CNS") that provides configurable private computer networks to multiple customers or other users of the service, such as by using cloud computing techniques with multiple computing systems that are provided on multiple physical networks (e.g., multiple physical computing systems and networks within a data center).

As previously noted, a virtual computer network may in some embodiments be provided as an overlay network that uses one or more intermediate physical networks as a substrate network, and one or more such overlay virtual computer networks may be implemented over the substrate network in various ways in various embodiments. For example, in at least some embodiments, communications between nodes of an overlay virtual computer network are managed by sending those communications over the substrate network without encapsulating the communications, such as by embedding virtual network address information for a computing node of the virtual computer network (e.g., the destination computing node's virtual network address) in a larger physical network address space used for a networking protocol of the one or more intermediate physical networks. As one illustrative example, a virtual computer network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual computer network and substrate computer network may be implemented using the same network addressing protocol (e.g., IPv4 or IPv6), and data transmissions sent via the provided overlay virtual computer network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay computer networks may be implemented using encapsulation of communications. Additional details related to SIIT are available at "Request For Comments 2765—Stateless IP/ICMP Translation Algorithm", February 2000, at tools<dot>ietf<dot>org<slash>html<slash>rfc2765 (where <dot> and <slash> are replaced by the corresponding characters with those names), which is hereby incorporated by reference in its entirety. More generally, in some embodiments when implementing a first overlay network using a second substrate network, an N-bit network address that is specified for the first overlay network in accordance with a first network addressing protocol may be embedded as part of another M-bit network address that is specified for the second substrate network in accordance with a second network addressing protocol, with "N" and "M" being any integers that correspond to network addressing protocols. In addition, in at least some embodiments, an N-bit network address may be embedded in another network address using more or less than N bits of the other network address, such as if a group of N-bit network addresses of interest may be represented using a smaller number of bits (e.g., with L-bit labels or identifiers being mapped to particular N-bit network addresses and embedded in the other network addresses, where "L" is less than "N").

Various benefits may be obtained from embedding virtual network address information in substrate network addresses for an underlying physical substrate network, including enabling an overlay of the virtual computer network on the physical substrate network without encapsulating communications or configuring physical networking devices of the physical substrate network, as discussed in greater detail below. Furthermore, other information may similarly be embedded in the larger physical network address space for a communication between computing nodes in at least some embodiments and situations, such as an identifier specific to a particular virtual computer network that includes those computing nodes (e.g., a virtual computer network for a user or other entity on whose behalf those computing nodes operate). Additional details related to provision of such virtual computer networks via use of overlay networks are included below.

Furthermore, in addition to managing communications having multiple alternative destinations that are computing nodes of provided virtual computer networks, the ONM system may use the described techniques to provide various other benefits in various situations, such as limiting communications to and/or from computing nodes of a particular virtual computer network to other computing nodes that belong to that virtual computer network. In this manner, computing nodes that belong to multiple virtual computer networks may share parts of one or more intermediate physical networks, while still maintaining network isolation for computing nodes of a particular virtual computer network. In addition, the use of the described techniques also allows computing nodes to easily be added to and/or removed from a virtual computer network, such as to allow a user to dynamically modify the size of a virtual computer network (e.g., to dynamically modify the quantity of computing nodes to reflect an amount of current need for more or less computing resources). Furthermore, the use of the described techniques also supports changes to an underlying substrate network—for example, if the underlying substrate network is expanded to include additional computing nodes at additional geographical locations, existing or new virtual computer networks being provided may seamlessly use those additional computing nodes, since the underlying substrate network will route communications to and from the substrate network addresses for those additional computing nodes in the same manner as for other previously existing substrate network computing nodes. In at least some embodiments, the underlying substrate network may be of any size (e.g., spanning multiple countries or continents), without regard to network latency between computing nodes at different locations.

For illustrative purposes, some embodiments are described below in which specific types of computing nodes, networks, communications, network topologies, and configuration operations are performed. These examples are provided for illustrative purposes and are simplified for the sake of brevity, and the inventive techniques may be used in a wide variety of other situations, some of which are discussed below.

FIG. 1 is a network diagram illustrating an example embodiment of configuring and managing communications between computing nodes belonging to a virtual computer network, so that the communications are overlaid on one or more intermediate physical networks in a manner transparent to the computing nodes. In this example, the configuring and managing of the communications is facilitated by a system manager module and multiple communication manager modules of an example embodiment of the ONM system. The example ONM system may be used, for example, in conjunction with a publicly accessible program execution service (not shown) and/or publicly accessible configurable network service (not shown), or instead may be used in other situations, such as with any use of virtual computer networks on behalf of one or more entities (e.g., to support multiple virtual computer networks for different parts of a business or other organization on a private network of the organization).

The illustrated example includes an example data center 100 with multiple physical computing systems operated on behalf of the ONM system. The example data center 100 is connected to a global internet 135 external to the data center 100, which provides access to one or more computing systems 145a via private network 140, to one or more other globally accessible data centers 160 that each have multiple computing systems (not shown), and to one or more other computing systems 145b. The global internet 135 may be, for example, a publicly accessible network of networks (possibly operated by various distinct parties), such as the Internet, and the private network 140 may be, for example, a corporate network that is wholly or partially inaccessible from computing systems external to the private network 140. Computing systems 145b may be, for example, home computing systems or mobile computing devices that each connects directly to the Internet (e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems (not shown) to manage communications for the associated computing systems 155a-155n, and a System Manager module 110 that executes on one or more computing systems (not shown). In this example, each physical computing system 105a-105d hosts multiple virtual machine computing nodes and includes an associated virtual machine ("VM") communication manager module (e.g., as part of a virtual machine hypervisor monitor for the physical computing system), such as VM Communication Manager module 109a and virtual machines 107a on host computing system 105a, and such as VM Communication Manager module 109d and virtual machines 107d on host computing system 105d. Physical computing systems 155a-155n do not execute any virtual machines in this example, and thus may each act as a computing node that directly executes one or more software programs on behalf of a user. The Communication Manager module 150 that manages communications for the associated computing systems 155a-155n may have various forms, such as, for example, a proxy computing device, firewall device or networking device (e.g., a switch, router, hub, etc.) through which communications to and from the physical computing systems travel. In other embodiments, all or none of the physical computing systems at the data center may host virtual machines.

This example data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes physical computing systems 105d and 155a-155n, as well as the computing systems providing the Communication Manager module 150 and the System Manager module 110, and is connected to edge router 125b. The physical sub-networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The illustrated System Manager module and Communication Manager modules may perform at least some of the described techniques in order to configure, authorize and otherwise manage communications sent to and from associated computing nodes, including to support pools of multiple related computing nodes for one or more virtual computer networks that are provided using various of the computing nodes. For example, Communication Manager module 109a manages associated virtual machine computing nodes 107a, Communication Manager module 109d manages associated virtual machine computing nodes 107d, and each of the other Communication Manager modules may similarly manage communications for a group of one or more other associated computing nodes. The illustrated Communication Manager modules may configure communications between computing nodes so as to overlay a particular virtual computer network over one or more intermediate physical networks that are used as a substrate network, such as over the interconnection network 120. Furthermore, a particular virtual computer network may optionally be extended beyond the data center 100 in some embodiments, such as if one or more other data centers 160 also provide computing nodes that are available for use by the example ONM system, and the particular virtual computer network includes computing nodes at two or more such data centers at two or more distinct geographical locations. Multiple such data centers or other geographical locations of one or more computing nodes may be interconnected in various manners, including the following: directly via one or more public networks; via a private connection, not shown (e.g., a dedicated physical connection that is not shared with any third parties, a VPN or other mechanism that provides the private connection over a public network, etc.); etc. In addition, while not illustrated here, other such data centers or other geographical locations may each include one or more other Communication Manager modules that manage communications for computing systems at that data center or other geographical location, as well as over the global internet 135 to the data center 100 and any other such data centers 160.

In addition, a particular virtual computer network may optionally be extended beyond the data center 100 in other manners in other embodiments, such as if one or more other Communication Manager modules at the data center 100 are placed between edge router 125c and the global internet 135, or instead based on one or more other Communication Manager modules external to the data center 100 (e.g., if another Communication Manager module is made part of private network 140, so as to manage communications for computing systems 145a over the global internet 135 and private network 140; etc.). Thus, for example, if an organization operating private network 140 desires to virtually extend its private computer network 140 to one or more of the computing nodes of the data center 100, it may do so by implementing one or more Communication Manager modules as part of the private network 140 (e.g., as part of the interface between the private network 140 and the global internet 135)—in this manner, computing systems 145a within the private network 140 may communicate with those data center computing nodes as if those data center computing nodes were part of the private network.

Thus, as one illustrative example, one of the virtual machine computing nodes 107a on computing system 105a (in this example, virtual machine computing node 107a1) may be part of the same virtual local computer network as one of the virtual machine computing nodes 107d on computing system 105d (in this example, virtual machine computing node 107d1), such as with the IPv4 networking protocol being used to represent the virtual network addresses for the virtual local network. The virtual machine 107a1 may then direct an outgoing communication (not shown) to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication, such as based on previously obtained information about the sending virtual machine computing node 107a1 and/or about the destination virtual machine computing node 107d1 (e.g., information about virtual networks and/or entities with which the computing nodes are associated), and/or by dynamically interacting with the System Manager module 110 (e.g., to obtain an authorization determination, to obtain some or all such information, etc.). By not delivering unauthorized communications to computing nodes, network isolation and security of entities' virtual computer networks is enhanced.

If the Communication Manager module 109a determines that the outgoing communication is authorized (or does not perform such an authorization determination), the module 109a determines the actual physical network location corresponding to the destination virtual network address for the communication. For example, the Communication Manager module 109a may determine the actual destination network address to use for the virtual network address of the destination virtual machine 107d1 by dynamically interacting with the System Manager module 110, or may have previously determined and stored that information (e.g., in response to a request from the sending virtual machine 107a1 for information about that destination virtual network address, such as a request that the virtual machine 107a1 specifies using Address Resolution Protocol, or ARP). The Communication Manager module 109a then re-headers or otherwise modifies the outgoing communication so that it is directed to Communication Manager module 109d using an actual substrate network address, such as if Communication Manager module 109d is associated with a range of multiple such actual substrate network addresses. FIGS. 2A-2D provide examples of doing such communication management in some embodiments, including to manage communications for pools of multiple related computing nodes for the virtual network.

When Communication Manager module 109d receives the communication via the interconnection network 120 in this example, it obtains the virtual destination network address for the communication (e.g., by extracting the virtual destination network address from the communication), and determines to which of the virtual machine computing nodes 107d managed by the Communication Manager module 109d that the communication is directed. The Communication Manager module 109d next determines whether the communication is authorized for the destination virtual machine computing node 107d1, with examples of such authorization activities discussed in further detail in the examples of FIGS. 2A-2D. If the communication is determined to be authorized (or the Communication Manager module 109d does not perform such an authorization determination), the Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards the modified communication to the destination virtual machine computing node 107d1. In at least some embodiments, before forwarding the incoming communication to the destination virtual machine, the Communication Manager module 109d may also perform additional steps related to security, as discussed in greater detail elsewhere.

In addition, while not illustrated in FIG. 1, in some embodiments the various Communication Manager modules and/or System Manager module 110 may take further actions to support pools of multiple related computing nodes for the virtual computer network, such as by managing communications between computing nodes of the virtual computer network in specified manners and by responding to other types of requests sent by computing nodes of the virtual computer network. For example, virtual machine computing node 107d1 may be part of a pool of multiple related computing nodes that is associated with the destination virtual network address used by sending computing node 107a1 to send the previously discussed example communication—as one illustrative example, the pool may further include virtual machine computing node 107c1 on host computing system 105c and physical computing system 155a. If so, before sending the example communication to computing node 107d1 using the indicated destination virtual network address, a selection of computing node 107d1 is made from the pool to be the recipient of the example communication from sending computing node 107a1. In particular, in this example, before sending the example communication, computing node 107a1 may have initiated an ARP request or other network message to obtain information about the virtual network address associated with the pool. If so, Communication Manager module 109a may intercept that request, and determine that the virtual network address indicated in the message is associated with the pool (whether alone or by interacting with the System Manager module 110). The Communication Manager module 109a and/or the System Manager module 110 may then perform the selection of one of the computing nodes from the pool to be used to receive communications from computing node 107a1, which in this example is destination computing node 107d1.

After computing node 107d1 has been selected from the pool, the Communication Manager module 109a then obtains information about the computing node 107d1 from System Manager module 110 or from another source, and provides a response to computing node 107a1's message that corresponds to selected destination computing node 107d1 (e.g., an ARP response that indicates a hardware address associated with computing node 107d1). Furthermore, Communication Manager module 109a may store the information about destination computing node 107d1's association with the indicated virtual network address on behalf of computing node 107a1, so that when computing node 107a1 later sends the example communication, Communication Manager module 109a may use the stored information regarding the association to forward the example communication to destination computing node 107d1 over the interconnection network 120. As discussed elsewhere, in other embodiments, the selection of a particular pool computing node to use for one or more communications may instead be made at other times, such as dynamically at a time of sending at least one of the one or more communications. In addition, the selection of a particular pool computing node to use for one or more communications may be made in various manners, such as based on information about computing node 107a1 and/or on information about some or all of the computing nodes in the pool. For example, computing node 107d1 may be selected in this example based on having the largest currently available capacity (e.g., being the least utilized currently), while in other embodiments computing node 107c1 may instead be selected based on being relatively nearer to computing node 107a1 within the network than the other pool computing nodes. Various techniques for selecting pool computing nodes are discussed in greater detail elsewhere, and the examples of FIGS. 2A-2C provide additional details regarding particular example messages and actions that may be performed when managing communications between computing nodes, including communications directed to a pool of multiple related computing nodes.

Furthermore, in this example, Communication Manager module 109a stores information about the association of computing node 107d1 with the indicated virtual network address for use with communications from computing node 107a1. If one or more of the other virtual machine computing nodes 107a that are managed by Communication Manager module 109a are part of the same virtual computer network and also later send a communication to the same virtual network address, the Communication Manager module 109a may respond in different manners in different embodiments. For example, in some embodiments the Communication Manager module 109a may use the existing mapping of the virtual network address to computing node 107d1 for some or all of the other such computing nodes, such that all of the computing nodes 107a that are part of the virtual computer network may use the same pool computing node. In other embodiments, a distinct selection of a pool computing node may be made for each such computing node 107a, such that different computing nodes 107a that are part of the virtual computer network may use different pool computing nodes for the same virtual network address. Furthermore, as an extension to the prior example, one of the computing nodes 107a other than computing node 107a1 may also be part of the previously discussed pool, and if so, that other computing node 107a may instead be selected as the pool computing node for use by computing node 107a1, such that the previously discussed example communication sent by computing node 107a1 to the virtual network address for the pool may instead be intercepted by Communication Manager module 109a and forwarded back to the other computing node 107a without being sent over the sub-network managed by switch 115a or over the interconnection network 120.

By providing support for pools of multiple related computing nodes using the described techniques, the ONM system provides various benefits. For example, because the various Communication Manager modules manage the overlay virtual network and the communications between computing nodes, particular virtual network addresses may each be overloaded and used to represent multiple distinct computing nodes, and the Communication Manager modules may consider various factors to select appropriate computing nodes to handle communications for such overloaded virtual network addresses (e.g., based on current conditions). When used to provide load balancing functionality or to provide high availability functionality even when particular computing nodes fail, such techniques provide additional functionality that would not otherwise be available in some situations at all, or in other situations without additional cost and effort to configure and use specialized hardware devices that provide related functionality. Furthermore, modifications are not needed to the interconnection network 120 or switches 115a-115b to support particular configured other related hardware devices (e.g., load balancer devices) or related network topologies. Moreover, the functionality may be transparently provided to computing nodes of virtual computer networks by the described techniques in at least some embodiments, without sending computing nodes even being aware that destination computing nodes for sent communications are part of pools of multiple related computing nodes or even that such pools exist.

Figure 2A:
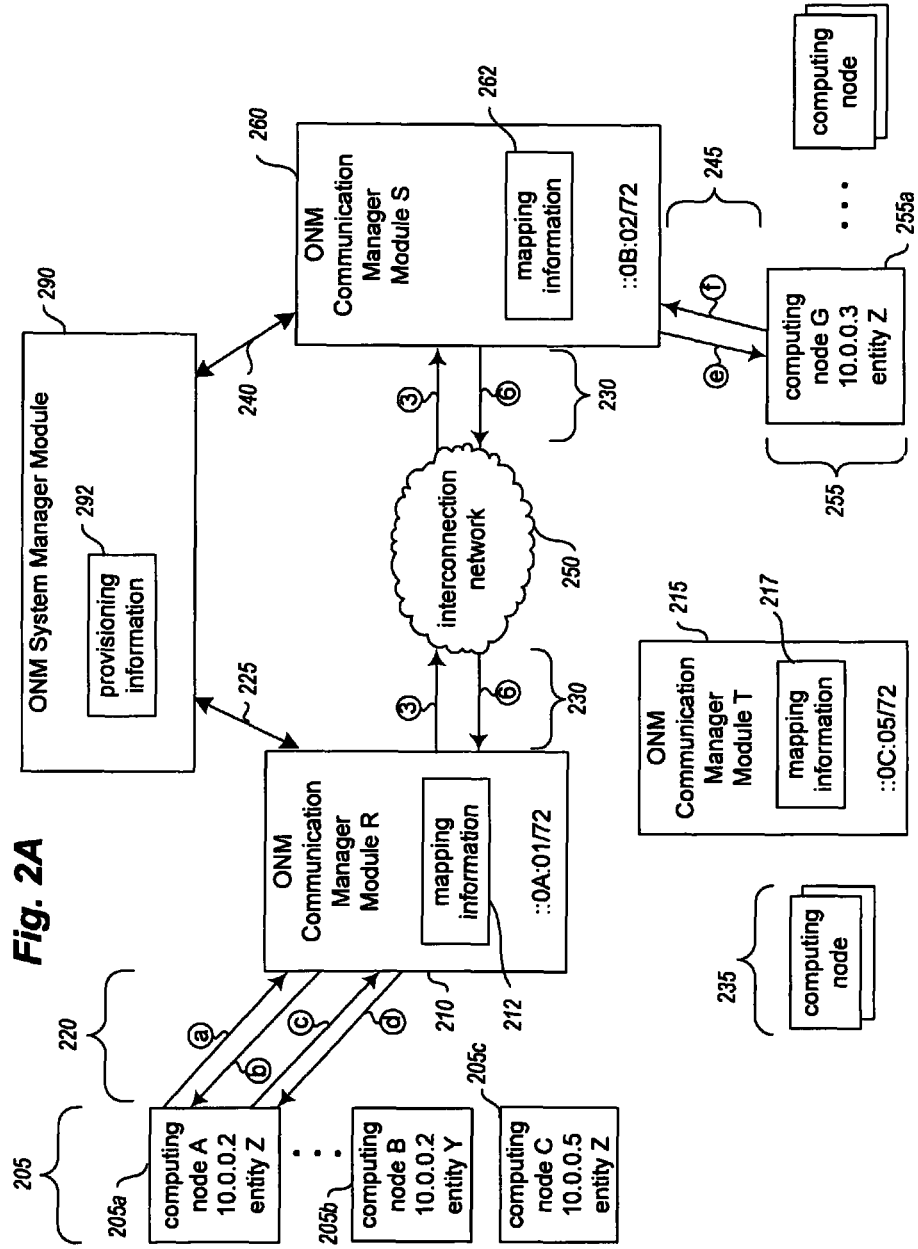
FIGS. 2A-2C illustrate examples of managing communications between computing nodes of a virtual overlay computer network.
Figure 2B:
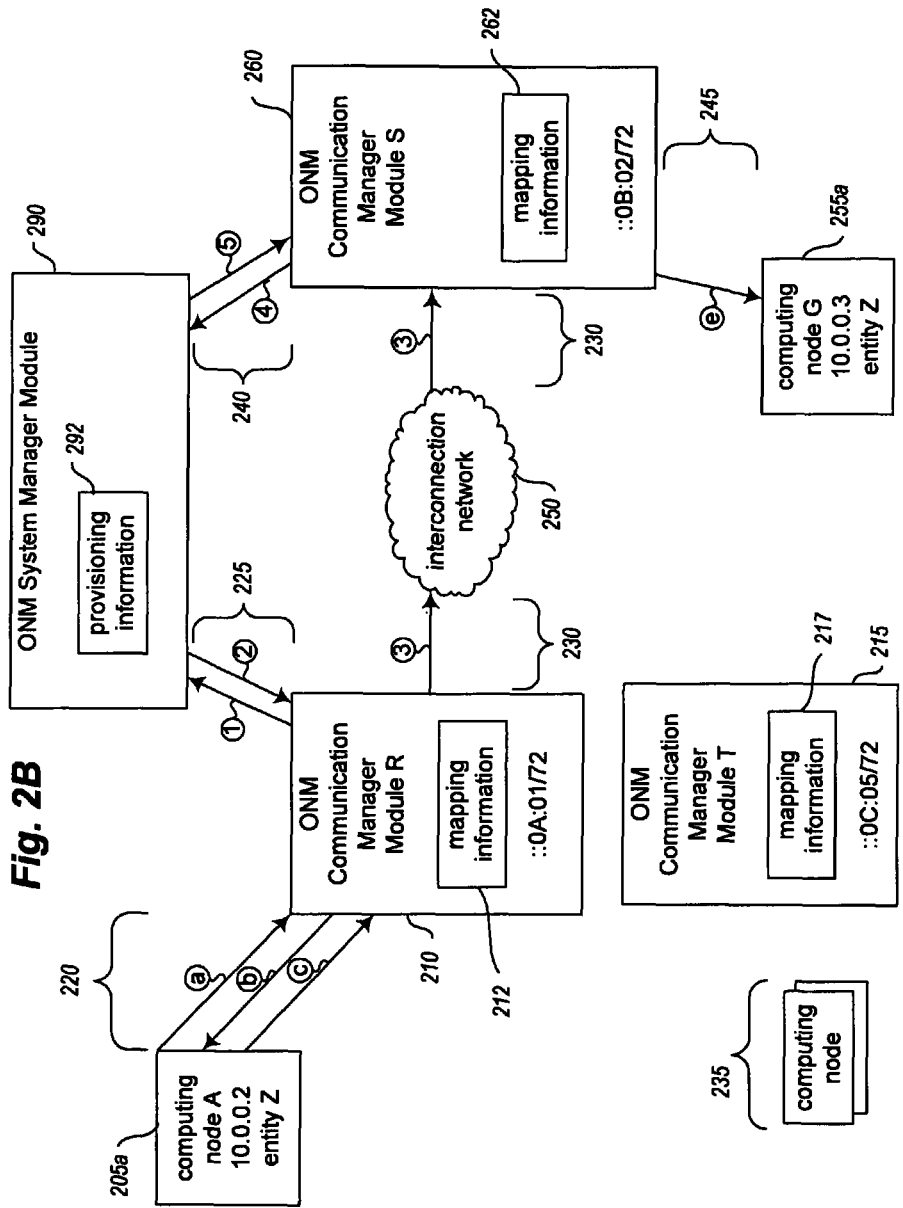
Figure 2C:
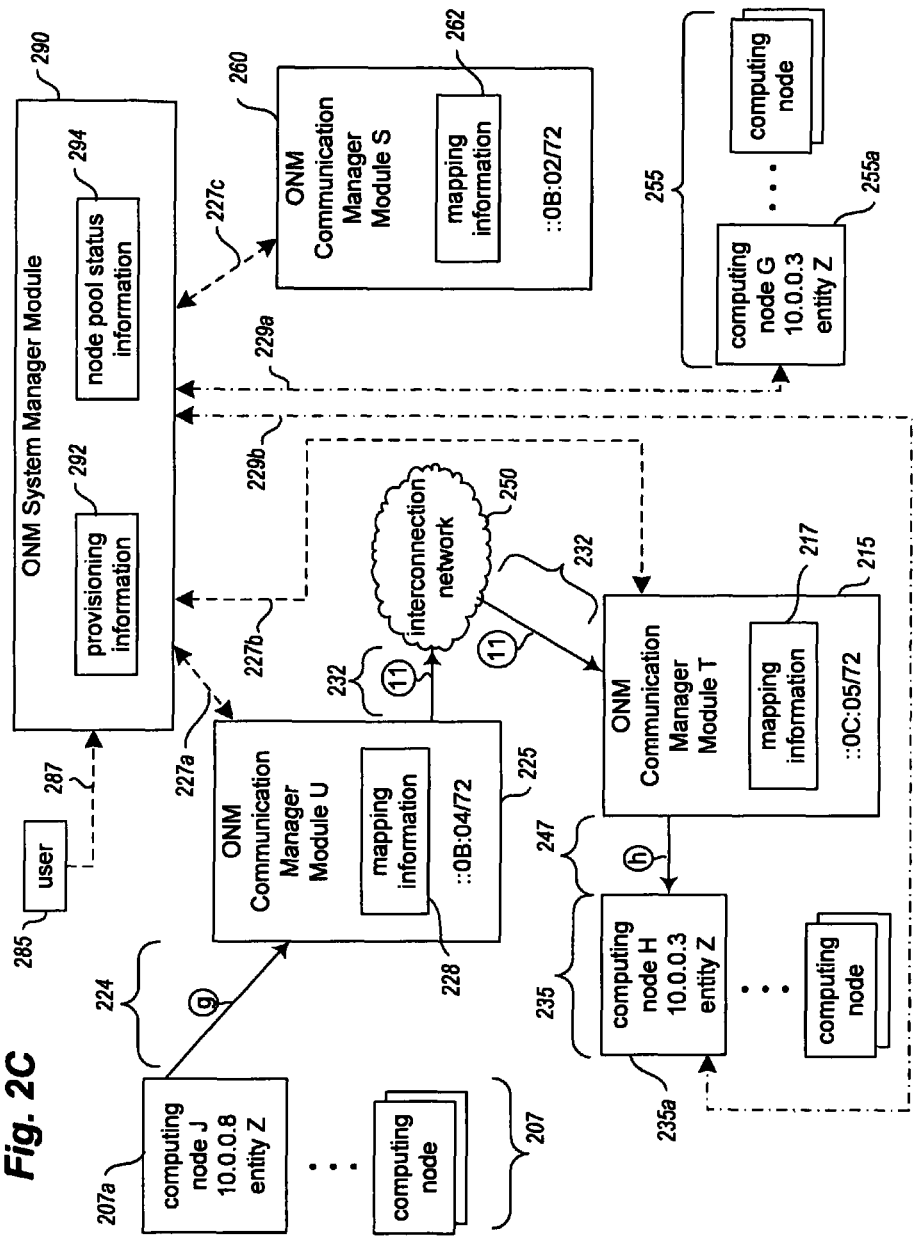

FIGS. 2A-2C illustrate further examples with additional illustrative details related to managing communications between computing nodes that occur via an overlay network over one or more physical networks, such as may be used by the computing nodes and networks of FIG. 1 or in other situations. In particular, FIG. 2A illustrates various example computing nodes 205, 235 and 255 that may communicate with each other by using one or more intermediate interconnection networks 250 as a substrate network. In this example, the interconnection network 250 is an IPv6 substrate network on which IPv4 virtual computer networks are overlaid, although in other embodiments the interconnection network 250 and overlay virtual computer networks may use the same networking protocol (e.g., IPv4). In addition, in this example embodiment, the computing nodes are operated on behalf of multiple distinct entities, and a System Manager module 290 manages the association of particular computing nodes with particular entities and virtual computer networks, and tracks various configuration information specified for the virtual computer networks. The example computing nodes of FIG. 2A include three computing nodes executed on behalf of an example entity Z and part of a corresponding virtual computer network provided for entity Z, those being computing nodes 205a, 205c, and 255a, and one or more of the computing nodes 235 may also be part of the virtual computer network. In addition, other computing nodes are operated on behalf of other entities and belong to other provided virtual computer networks, such as computing node 205b and other computing nodes 235 and 255.

In this example, the computing nodes 205 are managed by and physically connected to an associated Communication Manager module R 210, the computing nodes 255 are managed by and physically connected to an associated Communication Manager module S 260, and the computing nodes 235 are managed by and physically connected to an associated Communication Manager module T 215, although the physical interconnections between computing nodes and Communication Manager modules are not illustrated in this example. In addition, the ONM Communication Manager modules 210, 260 and 215 are physically connected to an interconnection network 250, as is the System Manager module 290, although those physical interconnections are similarly not illustrated. As one example, computing nodes 205 may each be one of multiple virtual machines hosted by a single physical computing system, and Communication Manager module R may be part of a hypervisor virtual machine monitor for that physical computing system. For example, with reference to FIG. 1, computing nodes 205 may represent the virtual machines 107a, and Communication Manager module R may correspond to Communication Manager module 109a. Similarly, computing nodes 255 may represent the virtual machines 107d of FIG. 1, Communication Manager module S may correspond to Communication Manager module 109d of FIG. 1, the interconnection network 250 may correspond to interconnection network 120 of FIG. 1, the System Manager module 290 may correspond to System Manager module 110 of FIG. 1, the computing nodes 235 may correspond to computing systems 155 of FIG. 1 or other computing nodes of FIG. 1 (e.g., virtual machine computing nodes 107c, computing systems at another data center 160, computing systems 145a, etc.), and Communication Manager module T may be a corresponding other Communication Manager module at the data center 100 (e.g., Communication Manager module 109b, Communication Manager module 109c, or Communication Manager module 150) or instead at another data center or other geographical location. Alternatively, computing nodes 205 or 255 may instead each be a distinct physical computing system, such as to correspond to computing systems 155a-155n of FIG. 1.

Each of the Communication Manager modules of FIG. 2A is associated with a group of multiple physical substrate network addresses, which the Communication Manager modules manage on behalf of their associated computing nodes. For example, Communication Manager module R is shown to be associated with the IPv6 network address range of "::0A: 01/72", which corresponds to the 128-bit addresses (in hexadecimal) from XXXX:XXXX:XXXX:XXXA:0100:0000: 0000:0000 to XXXX:XXXX:XXXX:XXXA:01FF:FFFF: FFFF:FFFF (representing 2 to the power of 56 unique IPv6 addresses), where each "X" may represent any hexadecimal character that is appropriate for a particular situation (e.g., with the initial 64 bits corresponding a particular organization and network topology, as discussed in greater detail with respect to FIG. 2D). The interconnection network 250 will forward any communication with a destination network address in that range to Communication Manager module R—thus, with the initial 72 bits of the range specified, the Communication Manager module R may use the remaining available 56 bits to represent the computing nodes that it manages and to determine how to process incoming communications whose destination network addresses are in that range.

For purposes of the example shown in FIG. 2A, computing nodes 205a, 205c, and 255a are part of a single virtual computer network for entity Z, and have assigned IPv4 virtual network addresses of "10.0.0.2", "10.0.5.1", and "10.0.0.3", respectively. Because computing node 205b is part of a distinct virtual computer network for entity Y, it can share the same virtual network address as computing node 205a without confusion. In this example, computing node A 205a wants to communicate with a computing node of the virtual computer network that has a virtual network address of "10.0.0.3," and the computing node G 255a will be identified as the corresponding computing node by the System Manager module 290, as discussed in greater detail below. When computing node A sends the communication to computing node G, it is managed by the ONM system modules in such a manner that the interconnection network 250, System Manager module 290 and Communication Manager modules are transparent to computing nodes A and G. In particular, despite the physical separation of computing nodes A and G, the Communication Manager modules 210 and 260 operate so as to overlay the virtual computer network for entity Z over the physical interconnection network 250 for communications between those computing nodes, so that the lack of an actual local network is transparent to the computing nodes A and G.

In order to send the communication to computing node G, computing node A exchanges various messages 220 with Communication Manager module R 210, despite in the illustrated embodiment being unaware of the existence of Communication Manager module R (i.e., computing node A may believe that it is transmitting a broadcast message to all other nodes on a local sub-network, such as via a logical switching device that computing node A believes connects the nodes on the local sub-network). In particular, in this example, computing node A first sends an ARP message request 220-a that includes the virtual network address of interest (i.e., "10.0.0.3") and that requests the corresponding hardware address for computing node G (e.g., a 48-bit MAC address). Communication Manager module R intercepts the ARP request 220-a, and responds to computing node A with a spoofed ARP response message 220-b that includes a virtual hardware address for computing node G.

To obtain the virtual hardware address for computing node G to use with the response message, the Communication Manager module R first checks a local store 212 of information that maps virtual hardware addresses to corresponding IPv6 actual physical substrate network addresses, with each of the virtual hardware addresses also corresponding to an IPv4 virtual network address for a particular entity's virtual network. If the local store 212 does not contain an entry for the destination virtual network address (e.g., if none of the computing nodes 205 have previously communicated with computing node G, if a prior entry in local store 212 for computing node G has expired based on an associated expiration time, etc.), the Communication Manager module R interacts 225 with System Manager module 290 to obtain the corresponding actual IPv6 physical substrate network address for the corresponding computing node on behalf of computing node A. In particular, in this example, the System Manager module 290 maintains provisioning information 292 that identifies where each computing node is actually located and to which entity and/or virtual computer network the computing node belongs, such as by initiating execution of programs on computing nodes for entities and virtual computer networks or by otherwise obtaining such provisioning information. Thus, the System Manager module identifies computing node G as having the indicated virtual network address for the virtual computer network, and as discussed in greater detail with respect to FIG. 2B, the System Manager module further determines whether the request from Communication Manager module R on behalf of computing node A for computing node G's actual IPv6 physical substrate network address is valid, including whether computing node A is authorized to communicate with computing node G, and if so provides that actual IPv6 physical substrate network address.

Communication Manager module R receives the actual IPv6 physical substrate network address for computing node G from the System Manager module 290, and stores this received information as part of a new entry associated with the destination virtual network address as part of mapping information 212 for later use (optionally with an expiration time and/or other information). In addition, in this example, Communication Manager module R determines a dummy virtual hardware address to be used for representing computing node G (e.g., by generating an identifier that is locally unique for the computing nodes managed by Communication Manager module R), stores that dummy virtual hardware address in conjunction with the received actual IPv6 physical substrate network address as part of the new mapping information entry, and provides the dummy virtual hardware address to computing node A as part of response message 220-b. By maintaining such mapping information 212, later communications from computing node A to computing node G may be authorized by Communication Manager module R without further interactions with the System Manager module 290, based on the use of the dummy virtual hardware address previously provided by Communication Manager module R. In other embodiments, the hardware address used by Communication Manager module R for computing node G may instead not be a dummy address, such as if System Manager module 290 further maintains information about hardware addresses used by the various computing nodes (e.g., virtual hardware addresses assigned to virtual machine computing nodes, actual hardware addresses assigned to computing systems acting as computing nodes, etc.) and provides the hardware address used by computing node G to Communication Manager module R as part of the interactions 225. In such embodiments, the Communication Manager module R may take further actions if computing nodes on different virtual networks use the same virtual hardware address, such as to map each combination of computing node hardware address and virtual computer network to a corresponding substrate network address.

In other embodiments, Communication Manager module R may interact with System Manager module 290 to obtain a physical substrate network address for computing node G or otherwise determine such a physical substrate network address at times other than upon receiving an ARP request, such as in response to any received communication that is directed to computing node G using the virtual network address "10.0.0.3" as part of entity Z's virtual computer network. Furthermore, in other embodiments the virtual hardware addresses that are used may differ from this example, such as if the virtual hardware addresses are specified by the System Manager module 290, if the virtual hardware addresses are not random and instead store one or more types of information specific to the corresponding computing nodes, etc. In addition, in this example, if computing node A had not been determined to be authorized to send communications to computing node G, whether by the System Manager module 290 and/or Communication Manager module R, Communication Manager module R would not send the response message 220-b with the virtual hardware address (e.g., instead sends no response or an error message response).

In this example, the returned IPv6 actual physical substrate network address corresponding to computing node G in interactions 225 is "::0B:02:<Z-identifier>:10.0.0.3", where "10.0.0.3" is stored in the last 32 bits of the 128-bit IPv6 address, and where "<Z-identifier>" is a 24-bit entity network identifier for computing node G corresponding to the virtual computer network for entity Z (e.g., as previously assigned by the System Manager module to that network to reflect a random number or some other number corresponding to the entity). The initial 72 bits of the IPv6 network address store the "::0B:02" designation, corresponding to the sub-network or other portion of the interconnection network with a network address range of "::0B:02/72" to which Communication Manager module S corresponds—thus, a communication sent over the interconnection network 250 to IPv6 destination network address "::0B:02:<Z-identifier>:10.0.0.3" will be routed to Communication Manager module S. In other embodiments, the entity network identifier may be other lengths (e.g., 32 bits, if Communication Manager module S has an associated network address range of 64 bits rather than 56 bits) and/or may have other forms (e.g., may be random, may store various types of information, etc.), and the last 56 bits used for the network address range after the "::0B:02" designation may store other types of information (e.g., an identifier for a particular entity, a tag or label for the virtual network, etc.). Additional details related to an example configured IPv6 actual physical network address for use with an overlay virtual computer network are described with respect to FIG. 2D.

After receiving the response message 220-b from Communication Manager module R, computing node A creates and initiates the sending of a communication to computing node G, shown in FIG. 2A as communication 220-c. In particular, the header of communication 220-c includes a destination network address for destination computing node G that is "10.0.0.3", a destination hardware address for destination computing node G that is the virtual hardware address provided to computing node A in message 220-b, a source network address for sending computing node A that is "10.0.0.2", and a source hardware address for sending computing node A that is an actual or dummy hardware address that was previously identified to computing node A. If computing node A believes that computing node G is part of the same local sub-network as itself, computing node A does not need to direct the communication 220-c to any intermediate logical router devices that are configured for a network topology to separate the computing nodes, such as by using a different destination virtual hardware address that corresponds to a logical local router device.

Communication Manager module R intercepts the communication 220-c, modifies the communication as appropriate, and forwards the modified communication over the interconnection network 250 to computing node G. In particular, Communication Manager module R extracts the virtual destination network address and virtual destination hardware address for computing node G from the header, and then retrieves the IPv6 actual physical substrate network address corresponding to that virtual destination hardware address from mapping information 212. As previously noted, the IPv6 actual physical substrate network address in this example is "::06:02:<Z-identifier>:10.0.0.3", and Communication Manager module R creates a new IPv6 header that includes that actual physical substrate network address as the destination address. Similarly, the Communication Manager module R extracts the virtual source network address and virtual source hardware address for computing node A from the header of the received communication, obtains an IPv6 actual physical substrate network address corresponding to that virtual source hardware address (e.g., from a stored entry in mapping information 212, by interacting with the System Manager module 290 to obtain that information if not previously obtained, etc.), and includes that actual physical substrate network address as the source network address for the new IPv6 header. In this example, the IPv6 actual physical substrate network address for computing node A is "::0A:01:<Z-identifier>:10.0.0.2", which if used in a reply by Communication Manager module S on behalf of computing node G will be routed to Communication Manager module R for forwarding to computing node A. The Communication Manager module R then creates communication 230-3 by modifying communication 220-c so as to replace the prior IPv4 header with the new IPv6 header (e.g., in accordance with SIIT), including populating the new IPv6 header with other information as appropriate for the communication (e.g., payload length, traffic class packet priority, etc.). Thus, the communication 230-3 includes the same content or payload as communication 220-c, without encapsulating the communication 220-c within the communication 230-3. Furthermore, access to the specific information within the payload is not needed for such re-headering, such as to allow Communication Manager module R to handle communications in which the payload is encrypted without needing to decrypt that payload.

In at least some embodiments, before forwarding communication 230-3 to Communication Manager module S, Communication Manager module R may perform one or more actions to determine that communication 220-c is authorized to be forwarded to computing node G as communication 230-3, such as based on the mapping information 212 including a valid entry for the destination virtual hardware address used in communication 220-c (e.g., an entry specific to sending computing node 205a in some embodiments, or instead an entry corresponding to any of the computing nodes 205 in other embodiments). In other embodiments, such an authorization determination may not be performed by Communication Manager module R for each outgoing communication, or instead may be performed in other manners (e.g., based on a determination that the sending node and destination node are part of the same virtual computer network or are associated with the same entity or are otherwise authorized to intercommunicate, based on an interaction with System Manager module 290 to obtain an authorization determination for the communication, etc.).

After Communication Manager module R forwards the modified communication 230-3 to the interconnection network 250, the interconnection network uses the physical IPv6 destination network address of the communication to route the communication to Communication Manager module S. In doing so, the devices of the interconnection network 250 do not use the portion of the destination network address that includes the embedded entity network identifier or embedded virtual network address, and thus do not need any special configuration to forward such a communication, nor even awareness that a virtual computer network is being overlaid on the physical interconnection network.

When Communication Manager module S receives communication 230-3 via the interconnection network 250, it performs actions similar to those of Communication Manager module R, but in reverse. In particular, in at least some embodiments, the Communication Manager module S verifies that communication 230-3 is legitimate and authorized to be forwarded to computing node G, such as via one or more interactions 240 with the System Manager module. If the communication is determined to be authorized (or if the authorization determination is not performed), the Communication Manager module S then modifies communication 230-3 as appropriate and forwards the modified communication to computing node G. Additional details related to the verification of the communication 230-3 are discussed with respect to FIG. 2B.

In particular, to modify communication 230-3, Communication Manager module S retrieves information from mapping information 262 that corresponds to computing node G, including the virtual hardware address used by computing node G (or generates such a virtual hardware address if not previously available, such as for a new computing node). Communication Manager module S then creates communication 245-e by modifying communication 230-3 so as to replace the prior IPv6 header with a new IPv4 header (e.g., in accordance with SIIT). The new IPv4 header includes the virtual network address and virtual hardware address for computing node G as the destination network address and destination hardware address for the new IPv4 header, the virtual network address and a virtual hardware address for computing node A as the source network address and source hardware address for the new IPv4 header, and includes other information as appropriate for the communication (e.g., total length, header checksum, etc.). The virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 255 for computing node A's hardware address). Thus, the communication 245-e includes the same content or payload as communications 220-c and 230-3. Communication Manager module S then forwards communication 245-e to computing node G.

After receiving communication 245-e, computing node G determines to send a response communication 245-f to computing node A, using the source virtual network address and source virtual hardware address for computing node A from communication 245-e. Communication Manager module S receives response communication 245-f, and processes it in a manner similar to that previously described with respect to communication 220-c and Communication Manager module R. In particular, Communication Manager module S optionally verifies that computing node G is authorized to send communications to computing node A, and then modifies communication 245-f to create communication 230-6 by generating a new IPv6 header using mapping information 262. After forwarding communication 230-6 to the interconnection network 250, the communication is sent to Communication Manager module R, which processes the incoming communication in a manner similar to that previously described with respect to communication 230-3 and Communication Manager module S. In particular, Communication Manager module R optionally verifies that computing node G is authorized to send communications to computing node A and that communication 230-6 actually was sent from the substrate network location of computing node G, and then modifies communication 230-6 to create response communication 220-d by generating a new IPv4 header using mapping information 212. Communication Manager module R then forwards response communication 220-d to computing node A. In other embodiments and situations, Communication Manager modules R and/or S may handle response communications differently from initial communications, such as to assume that response communications are authorized in at least some situations, and to not perform some or all authorization activities for response communications in those situations.

In this manner, computing nodes A and G may inter-communicate using a IPv4-based virtual computer network, without any special configuration of those computing nodes to handle the actual intervening IPv6-based substrate interconnection network, and interconnection network 250 may forward IPv6 communications without any special configuration of any physical networking devices of the interconnection network, based on the Communication Manager modules overlaying the virtual computer network over the actual physical interconnection network without encapsulation of communications and on using embedded virtual network addresses in the substrate physical network addresses.

In addition, while not illustrated with respect to FIG. 2A, in at least some embodiments the Communication Manager modules may receive and handle other types of requests and communications on behalf of associated computing nodes. For example, Communication Manager modules may take various actions to support broadcast and multicast capabilities for computing nodes that they manage. As one example, in some embodiments, a special multicast group virtual network address suffix may be reserved from each entity network identifier prefix for use in signaling networking Layer 2 raw encapsulated communications. Similarly, for link-local broadcast and multicast communications, a special multicast group /64 prefix may be reserved (e.g., "FF36:0000::"), while a different destination address prefix (e.g., "FF15:0000::") may be used for other multicast communications. Thus, for example, multicast and broadcast IP frames may be encapsulated using a corresponding reserved 64-bit prefix for the first 64 bits of the 128-bit IPv6 address, with the remaining 64 bits including the virtual IPv4 network address for the destination computing node and the entity network identifier for the destination computing node in a manner similar to that previously described. Alternatively, in other embodiments, one or more types of broadcast and/or multicast communications may each have a corresponding reserved label or other identifier that has a different value or form, including using a different number of bits and/or being stored in a manner other than as a network address prefix. When a computing node sends a broadcast/multicast communication, any Communication Manager module with an associated computing node that has subscribed to that multicast/broadcast group would be identified (e.g., based on those Communication Manager modules having subscribed to the group, such as in response to prior join communications sent by those associated computing nodes), and the Communication Manager module for the sending computing node would forward the communication to each of the identified Communication Manager modules of the group, for forwarding to their appropriate managed computing nodes. In addition, in some embodiments and situations, at least some broadcast or multicast communications may not be forwarded by Communication Manager modules, such as communications with an IPv4 prefix of 224.0/16 or another designated prefix or other label or identifier. In addition to supporting broadcast and multicast capabilities for managed computing nodes, the Communication Manager modules may receive and handle other types of requests and communications on behalf of associated computing nodes that correspond to configured network topologies for the virtual computer networks to which the computing nodes belong. For example, computing nodes may send various requests that a specified local router device or other specified networking device would be expected to handle (e.g., ping requests, SNMP queries, etc.), and the associated Communication Manager modules may intercept such requests and take various corresponding actions to emulate the functionality that would have been provided by the specified networking device if it was physically implemented.

In addition, it will be appreciated that a Communication Manager module may facilitate communications between multiple of the computing nodes that are associated with that Communication Manager module. For example, with respect to FIG. 2A, computing node 205a may wish to send an additional communication (not shown) to computing node 205c. If so, Communication Manager module R would perform actions similar to those previously described with respect to the handling of outgoing communication 220-c by Communication Manager module R and the handling of incoming communication 230-3 by Communication Manager module S, but without re-headering of the additional communication to use an IPv6 header since the communication will not travel over the interconnection network. However, if computing nodes 205a and 205c are configured in a network topology for the virtual computer network to be separated by one or more logical networking devices, the Communication Manager module R may take additional actions to emulate the functionality of those logical networking devices.

While not illustrated with respect to FIG. 2A, in at least some embodiments other types of requests and communications may also be handled in various ways. For example, in at least some embodiments, an entity may have one or more computing nodes that are managed by Communication Manager module(s) and that are part of a virtual computer network for that entity, and may further have one or more other non-managed computing systems (e.g., computing systems that are directly connected to the interconnection network 250 and/or that natively use IPv6 network addressing) that do not have an associated Communication Manager module that manages their communications. If the entity desires that those non-managed computing systems be part of that virtual computer network or otherwise communicate with the managed computing nodes of the virtual computer network, such communications between managed computing nodes and non-managed computing systems may be handled by the Communication Manager module(s) that manage the one or more computing nodes in at least some such embodiments. For example, in such situations, if such a non-managed computing system is provided with an actual IPv6 destination network address for such a managed computing node (e.g., "::0A:01:<Z-identifier>:10.0.0.2" for managed computing node A in this example), the non-managed computing system may send communications to computing node A via interconnection network 250 using that destination network address, and Communication Manager module R would forward those communications to computing node A (e.g., after re-headering the communications in a manner similar to that previously described) if Communication Manager module R is configured to accept communications from that non-managed computing system (or from any non-managed computing system). Furthermore, Communication Manager module R may generate a dummy virtual network address to correspond to such a non-managed computing system, map it to the actual IPv6 network address for the non-managed computing system, and provide the dummy virtual network address to computing node A (e.g., as the source address for the communications forwarded to computing node A from the non-managed computing system), thus allowing computing node A to send communications to the non-managed computing system.

Similarly, in at least some embodiments and situations, at least some managed computing nodes and/or their virtual computer networks may be configured to allow communications with other devices that are not part of the virtual computer network, such as other non-managed computing systems or other types of network appliance devices that do not have an associated Communication Manager module that manages their communications. In such situations, if the managed computing nodes and/or the virtual computer network is configured to allow communications with such other non-managed devices, such a non-managed device may similarly be provided with the actual IPv6 destination network address for such a computing node (e.g., "::0A:01:<Z-identifier>:10.0.0.2" for computing node A in this example), allowing the non-managed device to send communications to computing node A via interconnection network 250 using that destination network address, with Communication Manager module R then forwarding those communications to computing node A (e.g., after re-headering the communications in a manner similar to that previously described). Furthermore, Communication Manager module R may similarly manage outgoing communications from computing node A to such a non-managed device to allow computing node A to send such communications.

In addition, as previously noted, a communication manager module manages communications for associated computing nodes in various ways, including in some embodiments by assigning virtual network addresses to computing nodes of a virtual computer network, and/or by assigning substrate physical network addresses to managed computing nodes from a range of substrate physical network addresses that correspond to the communication manager module. In other embodiments, some such activities may instead be performed by one or more computing nodes of the virtual computer network, such as to allow a DHCP (Dynamic Host Configuration Protocol) server or other device of a virtual computer network to specify virtual network addresses and/or substrate physical network addresses to particular computing nodes of the virtual network. In such embodiments, the communication manager module obtains such configuration information from the virtual network device(s), and updates its mapping information accordingly (and in some embodiments may further update one or more system manager modules that maintain information about computing nodes associated with virtual networks). In yet other embodiments, a user or other entity associated with a virtual computer network may directly configure particular computing nodes to use particular virtual network addresses. If so, the communication manager modules and/or system manager module may track which virtual network addresses are used by particular computing nodes, and similarly update stored mapping information accordingly.

In addition, in some embodiments and situations, a managed computing node may itself be treated as a phantom router, with multiple virtual network addresses associated with that managed computing node, and with that managed computing node forwarding communications to other computing nodes that correspond to those multiple virtual network addresses. In such embodiments, the communication manager module that manages communications for that managed router computing node handles communications to and from that computing node in a manner similar to that previously described. However, the communication manager module is configured with the multiple virtual network addresses that correspond to the managed router computing node, so that incoming communications to any of those multiple virtual network addresses are forwarded to the managed router computing node, and so that outgoing communications from the managed router computing node are given a substrate source physical network address that corresponds to the particular computing node that sent the communication via the managed router computing node. In this manner, routers or other networking devices of a particular customer or other entity may be virtually represented for a virtual computer network implemented for that entity.

FIG. 2B illustrates some of the computing nodes and communications discussed with respect to FIG. 2A, but provides additional details with respect to some actions taken by the Communication Manager modules 210 and 260 and/or the System Manager module 290 to authorize communications between computing nodes. For example, after computing node A sends message 220-a to request a hardware address for computing node G, Communication Manager module R may perform one or more interactions 225 with the System Manager module 290 in order to determine whether to provide that information, such as based on whether computing node A is authorized to communicate with computing node G, as well as to determine a corresponding substrate physical network address for computing node G based on interconnection network 250. If the Communication Manager module R has previously obtained and stored that information and it remains valid (e.g., has not expired), then the interactions 225 may not be performed. In this example, to obtain the desired physical network address corresponding to computing node G, Communication Manager module R sends a message 225-1 to the System Manager module 290 that includes the virtual network addresses for computing nodes A and G, and that includes an entity network identifier for each of the computing nodes, which in this example is an entity network identifier for the virtual computer network of entity Z (e.g., a 32-bit or 24-bit unique identifier). In at least some embodiments, Communication Manager module R may send message 225-1 to the System Manager module 290 using an anycast addressing and routing scheme, so that multiple System Manager modules may be implemented (e.g., one for each data center that includes Communication Manager modules and associated computing nodes) and an appropriate one of those (e.g., the nearest, the most underutilized, etc.) is selected to receive and handle the message.

After the System Manager module 290 determines that computing node A is authorized to communicate with computing node G (e.g., based on having the same entity network identifier, based on computing node A having an entity network identifier that is authorized to communicate with computing nodes of the entity network identifier for computing node G, based on other information provided by or associated with computing node A indicating that computing node A is authorized to perform such communications, based on information provided by or associated with computing node G indicating that computing node A is authorized to perform such communications, etc.), the System Manager module 290 returns a response message 225-2 that includes the desired actual physical substrate network address corresponding to computing node G. In addition, in at least some embodiments, before sending the desired actual physical network address, the System Manager module 290 may further verify that Communication Manager module R is authorized to send the message 225-1 on behalf of computing node A, such as based on computing node A being determined to be one of the computing nodes to which Communication Manager module R is associated.

In other embodiments, Communication Manager module R may perform some or all of the actions described as being performed by System Manager module 290, such as to maintain provisioning information for the various computing nodes and/or to determine whether computing node A is authorized to send communications to computing node G, or instead no such authorization determination may be performed in some or all situations. Furthermore, in other embodiments, other types of authorization determinations may be performed for a communication between two or more computing nodes, such as based on a type of the communication, on a size of the communication, on a time of the communication, etc.

As previously noted with respect to FIG. 2A, after Communication Manager module S receives communication 230-3 intended for computing node G via the interconnection network 250, Communication Manager module S may perform one or more interactions 240 with the System Manager module 290 in order to determine whether to authorize that communication. In particular, in this example, to verify that the communication 230-3 is valid and authorized to be forwarded to computing node G, Communication Manager module S first extracts the actual IPv6 destination network address and actual IPv6 source network address from the header of communication 230-3, and then retrieves the embedded entity network identifiers and virtual network addresses from each of the extracted IPv6 network addresses. The Communication Manager module S next exchanges messages 240 with System Manager module 290 to obtain the corresponding actual IPv6 physical network address for the sending computing node A on behalf of computing node G, including a message 240-4 that includes the extracted virtual network addresses for computing nodes A and G and the entity network identifier for each of the computing nodes. In at least some embodiments, Communication Manager module S may send message 240-4 to the System Manager module 290 using an anycast addressing and routing scheme as previously described.

The System Manager module 290 receives message 240-4, and returns a response message 240-5 that includes the actual physical substrate network address corresponding to computing node A, which in this example is "::0A:01:<Z-identifier>: 10.0.0.2". As previously discussed with respect to messages 225-1 and 225-2, in some embodiments the System Manager module 290 and/or Communication Manager module S may further perform one or more other types of authorization determination activities, such as to determine that computing node G is authorized to communicate with computing node A, that Communication Manager module S is authorized to send the message 240-4 on behalf of computing node G, etc. Communication Manager module S then verifies that the returned physical network address in response message 240-5 matches the source IPv6 network address extracted from the header of communication 230-3, so as to prevent attempts to spoof messages as being from computing node A that are actually sent from other computing nodes in other locations. Communication Manager module S optionally stores this received information from response message 240-5 as part of an entry for computing node A in mapping information 262 for later use, along with computing node A's virtual network address and a virtual hardware address for computing node A.

FIG. 2C illustrates a further example of managing ongoing communications for the virtual computer network described with respect to FIGS. 2A and 2B, but with communications being managed to support a pool of multiple related computing nodes for the virtual computer network. In particular, FIG. 2C illustrates computing node G, Communication Manager modules S and T, System Manager module 290, and interconnection network 250 in a manner similar to that shown in FIGS. 2A and 2B. However, FIG. 2C further illustrates additional computing nodes, modules, and other information, including a new group of computing nodes 207 that are managed by and physically connected to an associated Communication Manager module U 225 (although the physical connections are not shown), and a user 285 who may optionally interact with the System Manager module 290. The computing nodes 207 and 235 each include an illustrated computing node that is part of the same virtual computer network for entity Z as computing nodes A, C and G of FIGS. 2A and 2B, with those new computing nodes being computing node J 207a and computing node H 235a.

In particular, in this example, computing node J wants to send an outgoing communication to the computing node of the virtual computer network with the destination virtual network address "10.0.0.3," in a manner similar to computing node A of FIG. 2A. However, in this example the virtual network address "10.0.0.3" is associated with a node pool that includes multiple related computing nodes of the virtual computer network, including computing node G 255a and computing node H 235a, although computing node J may be unaware of the existence of the node pool. Accordingly, the actions of the modules 225, 215 and 290 and network 250 in supporting the node pool and facilitating sending the communication are shown for this example. In addition, while geographical locations of particular computing nodes and modules are not illustrated, in this example the computing nodes 205 and 255 are in a first geographical location along with their associated Communication Manager modules R and S, while the computing nodes 207 and 235 are in a second geographical location along with their associated Communication Manager modules U and T, such as if the virtual computer network includes nodes in two or more distinct data centers and the interconnection network 250 or other substrate network (not shown) extends between those two or more data centers.

Thus, in a manner similar to that described with respect to FIG. 2A, computing node J determines to send one or more communications to the computing node of the virtual computer network that has the destination virtual network address of "10.0.0.3," although computing node H will be selected to be the corresponding pool computing node in this example for the communication(s) rather than computing node G. Accordingly, computing node J exchanges various messages 224 with Communication Manager module U. In particular, in this example, computing node J first sends an ARP message request 224-g for virtual hardware address information corresponding to the indicated virtual network address. Communication Manager module U intercepts the ARP request 224-g, and obtains a hardware address to provide to computing node J as part of spoofed ARP response message 224-h. The Communication Manager module U may determine the hardware address in various manners in various embodiments. For example, the Communication Manager module U may store various information as part of mapping information 228 for the indicated virtual network address, and if so may already have stored hardware address information that corresponds to the indicated virtual network address (e.g., hardware address information that represents computing node H, such as based on previous communications by computing node 207a or the other computing nodes 207 in which computing node H was selected to represent the node pool for those previous communications, or instead hardware address information that represents another pool computing node).

If Communication Manager module U does not already store information as part of mapping information 228 for the indicated virtual network address, however, Communication Manager module U performs one or more interactions 226 with the System Manager module 290 to obtain information from the module 290 corresponding to the indicated virtual network address, in a manner similar to that described with respect to FIGS. 2A and 2B. In this case, however, the System Manager module 290 maintains various information 294 about the identified node pools for the various virtual computer networks provided by the ONM system, including the node pool that includes computing nodes G and H (and optionally other computing nodes, not shown) for the current virtual computer network. Accordingly, the System Manager module 290 determines that the indicated virtual network address corresponds to the node pool, and selects computing node H to be the representative pool computing node to use to receive the communication(s) from computing node J. As discussed in greater detail elsewhere, computing node H may be selected in various manners, such as based on being a "nearest" computing node to computing node J of the computing nodes in the pool that are currently available. After selecting computing node H, the System Manager module 290 provides information to Communication Manager module U as part of the interactions 226 that indicates the physical substrate network address associated with computing node H, and may optionally provide various other information in some embodiments (e.g., a hardware address associated with computing node H, an indication that the virtual network address is associated with a node pool, an indication of one or more other pool computing nodes in addition to computing node H (optionally with ranking information or other information for use by Communication Manager module U in selecting a particular one of the multiple indicated computing nodes for use with computing node J), an indication of an expiration time or other limit on using the provided information, etc.). After receiving the response information from the System Manager module 290, the Communication Manager module U then stores the received information as part of mapping information 228 for future use. Furthermore, Communication Manager module U provides computing node J with a hardware address corresponding to computing node H as part of response message 224-h.

After receiving the response message 224-h from Communication Manager module U, computing node J creates and initiates the sending of a communication to computing node H, shown in FIG. 2C as communication 224-i. In particular, the header of communication 224-i includes a destination network address for destination computing node H that is "10.0.0.3", a destination hardware address that is the hardware address provided to computing node J in message 224-h, a source network address for sending computing node J that is "10.0.0.8", and a source hardware address for sending computing node J that is an actual or dummy hardware address that was previously identified to computing node J. The communication 224-i is intercepted and handled by Communication Manager module U in a manner similar to that described in FIG. 2A for communication 220-c, including the Communication Manager module U modifying the communication to use the physical substrate network address for computing node H, and forwarding the modified communication over the interconnection network 250 as communication 232-11 to computing node H. As discussed in greater detail elsewhere, the Communication Manager module U and/or the System Manager module 290 may further perform various optional authentication activities with respect to some or all of the messages 224 and interactions 226.

The communication 232-11 sent over the interconnection network 250 to the substrate network address for computing node H will be routed to Communication Manager module T, in a manner similar to that previously discussed for communication 230-3 and Communication Manager module S in FIG. 2A. In addition, when Communication Manager module T receives communication 232-11 via the interconnection network 250, it performs actions similar to those described in FIG. 2A with respect to communication 230-3 and Communication Manager module S, including to modify the communication to include an appropriate IPv4 header, to provide the modified communication as communication 247-*h* to computing node H, and to optionally update mapping information 217 to include information about the sending computing node J.

Thus, in this manner, the various modules of the ONM system supports node pools that each have multiple related computing nodes, such as to allow different computing nodes of a virtual computer network to simultaneously communicate with different pool computing nodes that share a common virtual network address, and in at least some embodiments provide the computing node pool support in a manner that is transparent to the computing nodes of the virtual computer network.

In addition, as discussed in greater detail elsewhere, the System Manager module 290 may identify pools of multiple related computing nodes in various manners, and may obtain and use status information about such computing node pools in various manners. For example, in the example of FIG. 2C, a user 285 who represents entity Z may optionally perform one or more interactions 287 with the System Manager module 290 to configure the pool of computing nodes associated with the virtual network address "10.0.0.3" and/or to perform various other configuration activities. In addition, various information may be requested by the System Manager module 290 regarding computing node pools and/or may be otherwise provided to the System Manager module 290 at various times. For example, as illustrated in FIG. 2C, System Manager module 290 may optionally perform various interactions 229 with computing nodes of the identified pool for entity Z's virtual computer network at one or more times, such as to determine if the computing nodes are alive or to obtain other types of status information. The System Manager module 290 may further optionally perform various interactions 227 with Communication Manager modules associated with pool computing nodes to obtain similar information, whether instead of or in addition to interactions 229 with the pool computing nodes. Furthermore, in other embodiments, entity Z may take other actions to monitor or manage the pool of computing nodes, such as to perform interactions 287 with the System Manager module 290 to request and receive information about current status of the pool, and/or to configure some or all of the pool computing nodes to interact with each other (not shown) in order to determine and report current status for the various pool computing nodes.

In this manner, the ONM system may provide support for pools of multiple related computing nodes, without any special configuration of the computing nodes of the virtual computer network or of the physical networking devices of the intervening substrate interconnection network, based on the Communication Manager modules overlaying the virtual computer network on the actual physical interconnection network and managing inter-node communications accordingly.

As previously noted, configuration information that is specified for a virtual computer network may include various information about pools of multiple related computing nodes, and various computing nodes may be selected to be part of a pool and/or to be used to represent the pool in responding to particular communications in various manners. For example, in some embodiments, the selection of a computing node to be used and/or to be assigned a particular role may be based at least in part on a geographical and/or network location of the computing node, such as an absolute location, or instead a location relative to one or more other computing resources of interest (e.g., other computing nodes of the same virtual computer network, storage resources to be used by the computing node, etc.), such as within a minimum and/or maximum specified geographical distance or other degree of proximity to an indicated other computing resource or other location. In addition, in some embodiments, factors used when selecting a computing node may be not be based on location, such as to include one or more of the following: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; etc.

Various other types of actions than those discussed with respect to FIGS. 2A-2C may be performed in other embodiments, including for types of network addressing protocols other than IPv4 and IPv6.

Figure 2D:
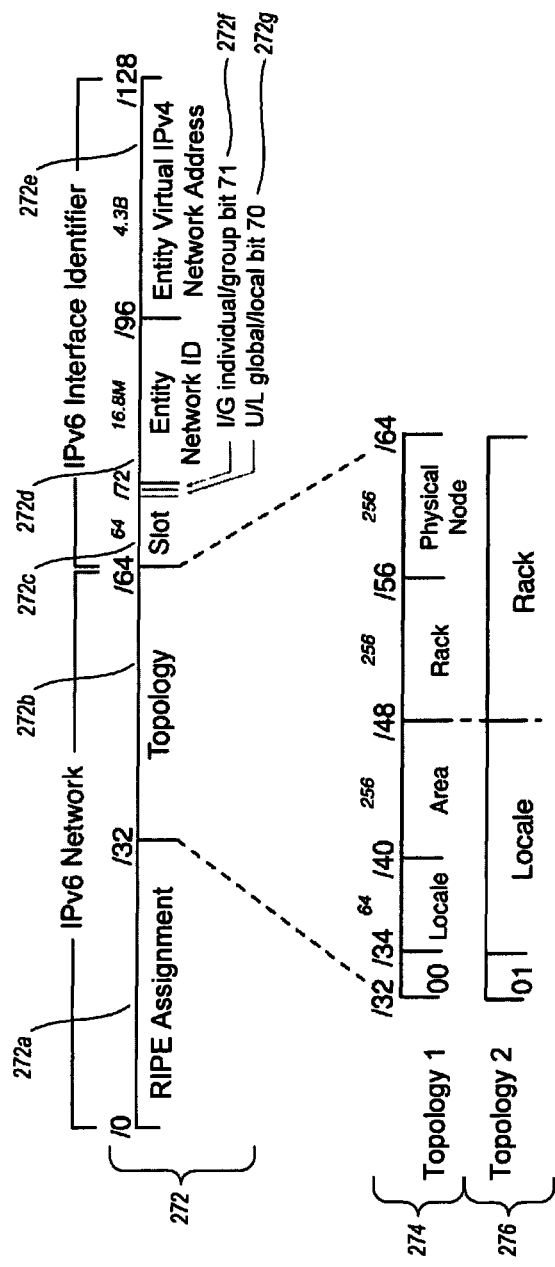
FIG. 2D illustrates an example of configuring underlying substrate network addresses so as to enable embedding of virtual network addresses for an overlay network.

FIG. 2D illustrates an example IPv6 physical substrate network address configuration 272 for use with the described techniques in some embodiments, with the example network address being configured so as to embed a virtual network address and other information in the substrate network address so as to enable an overlay virtual computer network over the substrate computer network. As previously discussed, this example IPv6 network address configuration uses the 128-bit network address space to store various information, with the initial 64 bits storing an IPv6 network portion of the address, and with the subsequent 64 bits storing an interface identifier (or "host") portion of the address.

In this example, the initial 64-bit network portion of the IPv6 address includes a 32-bit identifier 272*a* for bits 0 through 31 that corresponds to a corporate or other organization identifier assigned to such an organization by an Internet registry operator on behalf of the Internet Assigned Numbers Authority (in this example, based on an assignment from the Regional Internet Registry RIPE NNC, or Reseaux IP Européens Network Coordination Centre). For example, in some embodiments, an organization that operates an embodiment of the ONM system or another organization that uses the described techniques may have an associated identifier 272*a*. The initial 64-bit network portion of the address also includes a 32-bit group of information 272*b* in this example that corresponds to topology of a group of multiple computing nodes (e.g., a sub-network or other network portion) provided on behalf of the group whose identifier is indicated in information 272*a*. As previously discussed, in at least some embodiments, the initial 64-bit network portion of the address represents a partial network address for the substrate network that corresponds to a location of multiple related computing nodes, such as a sub-network or other portion of the substrate network. In particular, the initial 64-bit network address portion in at least some embodiments corresponds to a particular communication manager module that represents multiple associated computing nodes being managed by the communication manager module, such as based on the communication manager module managing the range of network addresses corresponding to some or all of the 64-bit interlace identifier address portion in order to represent the various managed computing nodes. In other embodiments, the partial network address may be represented with a different number of bits (e.g., 72) and/or using a part of the address other than a prefix.

The 32-bit group of topology information 272*b* may represent various information in various ways in different embodiments, with topology information groups 274 and 276 showing two alternative example configurations of topology information. In particular, in the examples of 274 and 276, the first two bits (bits 32 and 33 of the overall IPv6 address) indicate a particular version of the topology information, such that the meaning of the remaining 30 bits may change over time or in different situations. With respect to example 274, various bits as shown each indicate different geographical locales, geographic areas within the locales, computer racks within the geographic areas, and physical computing system nodes within the computer racks. In this example, the 6 bits for the locale information may represent 64 unique values, the 8 bits for the area information may represent 256 unique values for each locale value, the 8 bits for the rack information may represent 256 unique values for each area value, and the 8 bits for the physical computing system node information may represent 256 unique values for each rack value. Conversely, with respect to example 276, only locale and rack information is shown, but each have additional bits in order to represent those types of information, such as to have 16,384 unique locale values using its 14 bits, and to have 65,536 unique rack values using its 16 bits for each locale value. It will be appreciated that topology information may be represented in other manners in other embodiments.

In this example, the 64-bit interface identifier portion of the IPv6 address is configured to store several types of information, including a 6-bit identifier 272c that corresponds to a particular computing node slot (e.g., a particular virtual machine computing node on a particular physical computing system corresponding to the initial 64-bit network portion of the IPv6 address), two 1-bit identifiers 272f and 272g, a 24-bit identifier 272d to embed an entity network identifier (e.g., to reference a particular virtual computer network), and a 32-bit identifier 272e to embed an IPv4 network address (e.g., a virtual network address). The 6 bits for the slot identifier may represent approximately 64 unique values, the 24 bits for the embedded entity network identifier may represent approximately 16.8 million unique values, and the 32 bits for the embedded IPv4 network address may represent approximately 4.3 billion unique values. In this example, the 1-bit identifier 272g (bit 70 of the IPv6 address) represents a U/L global/local bit that in some embodiments may indicate whether the address is globally administered or locally administered, and the 1-bit identifier 272f (bit 71 of the IPv6 address) represents an I/G individual/group bit that in some embodiments may indicate whether the address corresponds to a single computing node or to a group of multiple computing nodes (e.g., as part of a broadcast or multicast). In at least some embodiments, the I/G bit is set to zero, and the U/L bit is set to one when virtual forwarding of the corresponding communication is being used, such as for use in virtual sub-netting via phantom computing node routers and/or to indicate that an incoming communication with such a destination address be delivered to a computing node corresponding to the value of the 6-bit slot identifier rather than a computing node corresponding to the values of the 32-bit IPv4 embedded network address and 24-bit entity network identifier. It will be appreciated that the interface identifier information may be represented in other manners in other embodiments.

As previously noted, the ONM system may in at least some embodiments establish and/or maintain virtual computer networks via the operation of one or more communication manager modules at the edge of one or more intermediate physical networks, such as by configuring and otherwise managing communications for the virtual computer networks. In some situations, a communication manager module tracks or otherwise determines the virtual computer networks to which the module's associated computing nodes belong (e.g., based on entities on whose behalf the virtual computer networks operate) as part of managing the communications for the virtual computer networks. The determination by a communication manager module of a corresponding virtual computer network for a computing node may be performed in various ways in various embodiments, such as by interacting with a system manager module that provides that information, by tracking software programs executing on such computing nodes, by tracking entities associated with such computing nodes, etc. For example, when a particular computing node begins to execute one or more software programs on behalf of a user, and that user also has other software programs executing on other computing nodes, the new computing node executing the user's program(s) may be selected to be associated with a virtual computer network for the user that includes those other computing nodes. Alternatively, a user or other entity may specify a particular virtual computer network to which a computing node belongs, such as if the entity maintains multiple distinct virtual computer networks between different groups of computing nodes. In addition, in at least some embodiments, one or more system manager modules of the ONM system may facilitate configuring communications between computing nodes, such as by tracking and/or managing which computing nodes belong to which virtual computer networks (e.g., based on executing programs on behalf of a customer or other entity), and by providing information about actual physical substrate network addresses that correspond to virtual network addresses used for a particular virtual computer network (e.g., by a particular customer or other entity).

As previously noted, in some embodiments, a program execution service executes third-party customers' programs using multiple physical computing systems (e.g., in one or more data centers) that each host multiple virtual machines, with each virtual machine being able to execute one or more programs for a customer. In some such embodiments, customers may provide programs to be executed to the program execution service, and may reserve execution time and other resources on physical or virtual hardware facilities provided by the program execution service. In addition, customers and/or the program execution service may define virtual computer networks that will be used by the program execution service for computing nodes of the customer, so as to transparently provide computing nodes of a virtual computer network with the appearance of operating on a dedicated physical network. In addition, in some embodiments, a virtual computer network that is managed by an embodiment of the ONM system may be a configured computer network provided by a configurable network service. In some such embodiments, customers or other users may specify various types of configuration information for their provided configured computer networks, and may interact from one or more remote locations with their provided configured computer networks.

Figure 3:
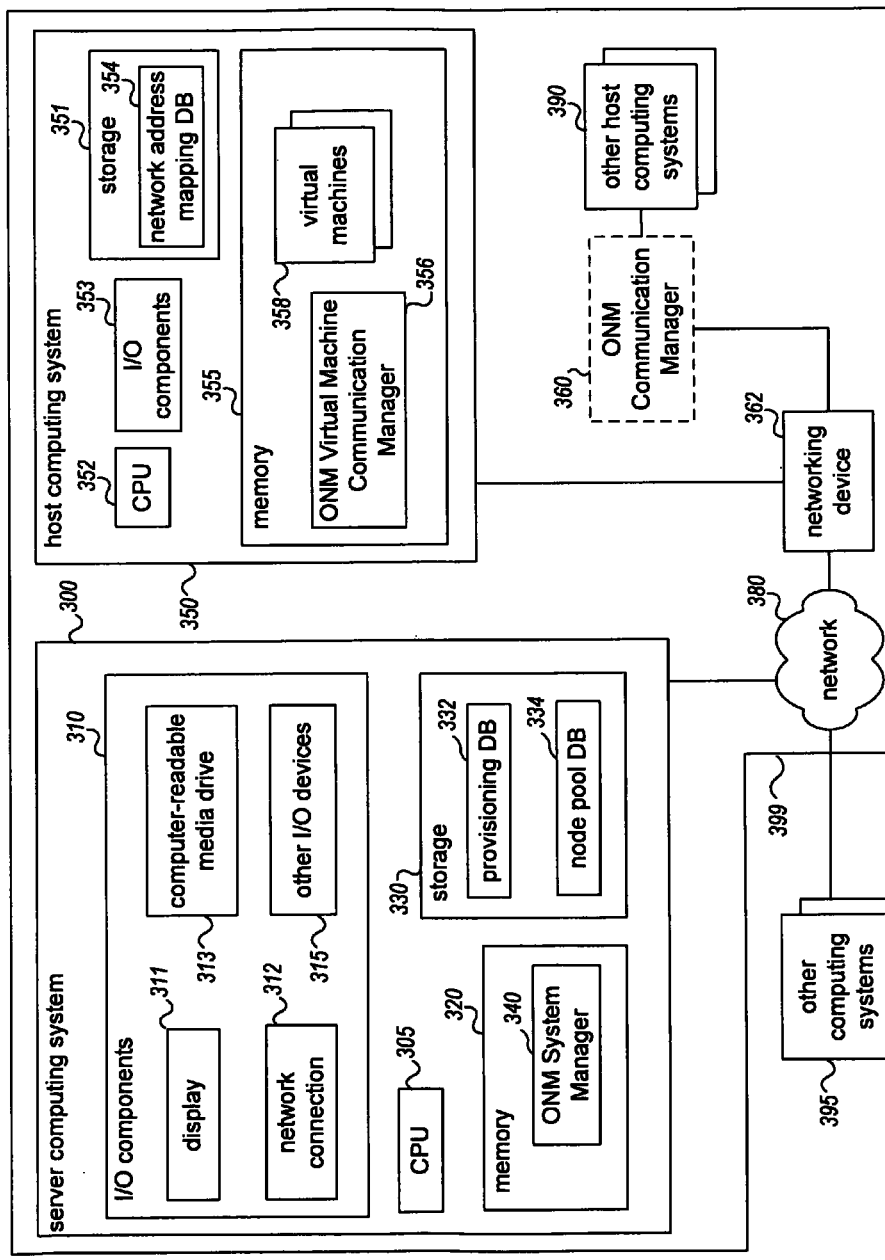
FIG. 3 is a block diagram illustrating example computing systems suitable for executing an embodiment of a system for managing communications between computing nodes.

FIG. 3 is a block diagram illustrating example computing systems suitable for executing an embodiment of a system for managing communications between computing nodes. In particular, FIG. 3 illustrates a group 399 of computing systems and inter-network(s), such as a data center or other group of co-located computing nodes. In some embodiments, some or all of the computing systems of the group 399 may be used by an embodiment of the ONM system to provide virtual computer networks to users or other entities. The group 399 includes a server computing system 300, a host computing system 350 capable of executing one or more virtual machines, other host computing systems 390 that are similar to host computing system 350, and an optional Communication Manager module 360 that manages host computing systems 390 or that executes on one of the computing systems 390 or on another computing system (not shown). The system manager computing system 300 and host computing systems 350 and 390 are connected to one another via an internal network 380, which includes a networking device 362 and other networking devices (not shown). The network 380 may be an interconnection network that joins multiple disparate physical networks (not shown) for the group 399 and possibly provides access to external networks (not shown) and/or systems, such as other computing systems 395. In the illustrated example, the networking device 362 provides a gateway between the network 380 and host computing systems 350 and 390. In some embodiments, networking device 362 may, for example, be a router or a bridge.

The computing system 300 operates to configure and manage virtual computer networks within the group 399, as well as to provide other functions (e.g., the provisioning, initialization, and execution of programs on computing nodes). The computing system 300 includes a CPU 305, various I/O components 310, storage 330, and memory 320. The I/O components include a display 311, network connection 312, computer-readable media drive 313, and other I/O devices 315 (e.g., a mouse, keyboard, speakers, etc.).

The host computing system 350 operates to host one or more virtual machines, such as for use as computing nodes in virtual computer networks (e.g., computing nodes that execute programs on behalf of various users). The host computing system 350 includes a CPU 352, various I/O components 353, storage 351, and memory 355. While not illustrated here, the I/O components 353 may include similar components to those of I/O components 310. A virtual machine Communication Manager module 356 and one or more virtual machines 358 are executing in the memory 355, with the module 356 managing communications for the associated virtual machine computing nodes 358. The Communication Manager module 356 maintains various mapping information 354 on storage related to the computing nodes 358 and other computing nodes, such as in a manner similar to mapping information 212 and 262 of FIGS. 2A-2B. The structure of the other host computing systems 390 may be similar to that of host computing system 350, or instead some or all of the host computing systems 350 and 390 may act directly as computing nodes by executing programs without using hosted virtual machines. In a typical arrangement, the group 399 may include hundreds or thousands of host computing systems such as those illustrated here, organized into a large number of distinct physical sub-networks and/or networks.

An embodiment of a System Manager module 340 is executing in memory 320 of the computing system 300. In some embodiments, the System Manager module 340 may receive an indication of multiple computing nodes to be used as part of a virtual computer network (e.g., one or more virtual machine computing nodes on host computing system 350 or one or more computing nodes using one of the host computing systems 390), and in some situations may select the particular computing node(s) for the virtual computer network. In some cases, information about the structure and/or membership of various virtual computer networks may be stored in the provisioning database 332 on storage 330 by the module 340, and provided to the Communication Manager modules at various times. Similarly, in some cases, the System Manager module 340 may receive an indication of multiple computing nodes to be used as part of a particular computing node pool for a particular virtual computer network, and in some situations may select the particular computing node(s) for the node pool. In addition, information about pools of multiple related computing nodes of various virtual computer networks may be stored in the node pool database 334 on storage 330 by the module 340, such as in a manner similar to node pool status information 294 of FIG. 2C, and provided to the Communication Manager modules or otherwise used at various times.

As discussed in greater detail elsewhere, the Communication Manager modules 356 and 360 (and other Communication Manager modules, not shown, that manage other associated computing nodes, not shown) and the System Manager module 340 may interact in various ways to manage communications between computing nodes, including to support pools of multiple related computing nodes for provided virtual computer networks. Such interactions may, for example, enable the computing nodes 358 and/or other computing nodes to inter-communicate over virtual computer networks without any special configuration of the computing nodes, by overlaying the virtual computer networks over network 380 and optionally one or more external networks (not shown) without any special configuration of networking device 362 or other networking devices (not shown), and without encapsulation of communications.

It will be appreciated that computing systems 300, 350, 390, and 395, and networking device 362, are merely illustrative and are not intended to limit the scope of the present invention. For example, computing systems 300 and/or 350 may be connected to other devices that are not illustrated, including through one or more networks external to the group 399, such as the Internet or via the World Wide Web ("Web"). More generally, a computing node or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
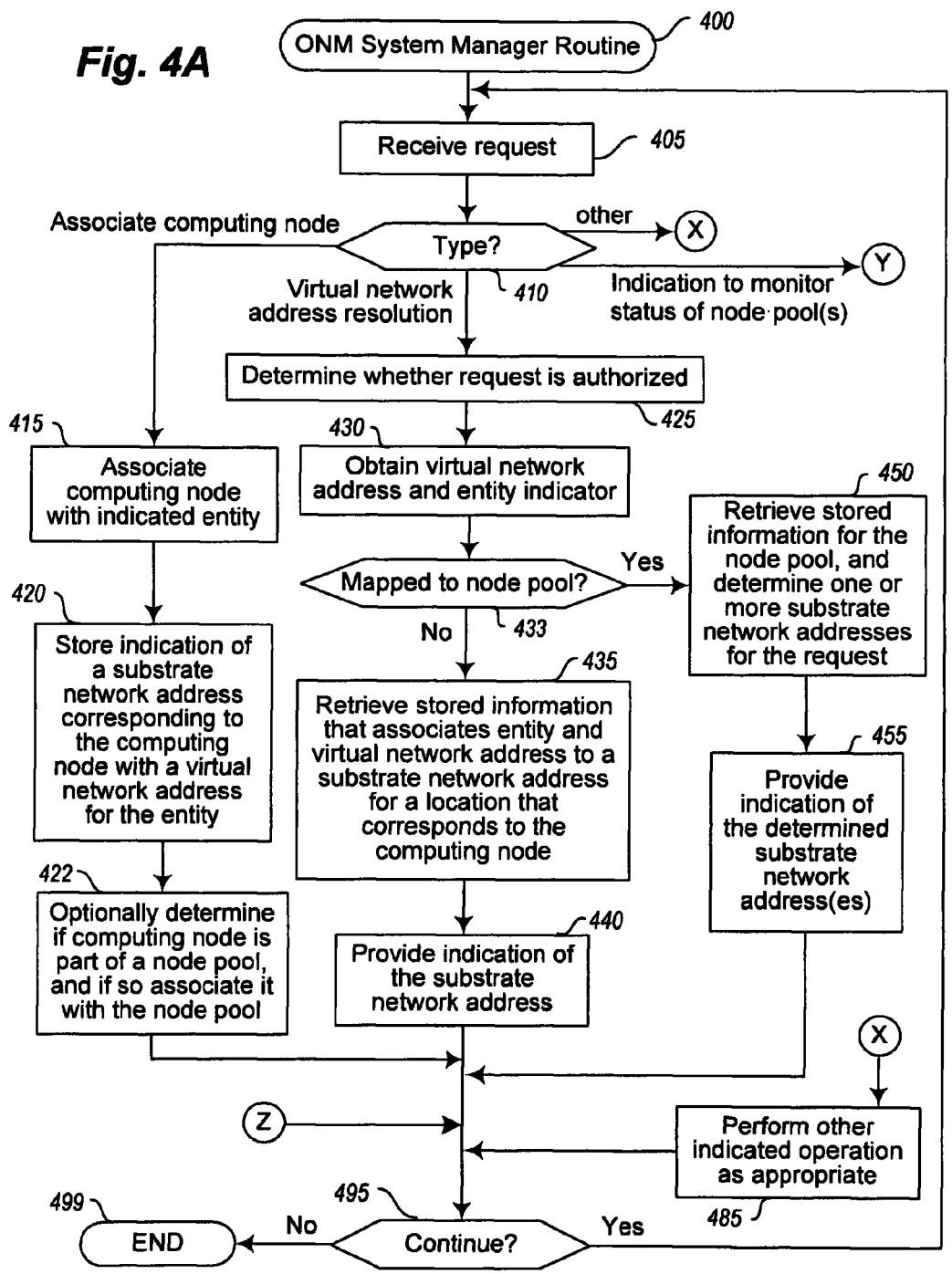
FIGS. 4A-4B illustrate a flow diagram of an example embodiment of an ONM System Manager routine.
Figure 4B:
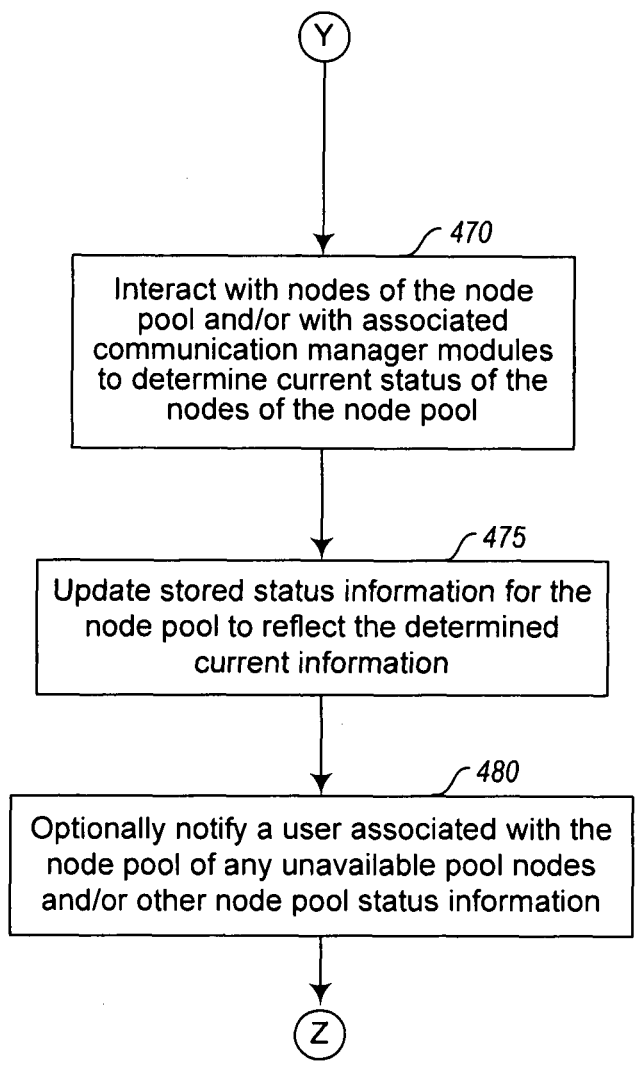

FIGS. 4A-4B are a flowchart of an example embodiment of an ONM System Manager routine 400. The routine may be provided by, for example, execution of the system manager module 110 of FIG. 1, the system manager module 290 of FIGS. 2A-2C, and/or the system manager module 340 of FIG. 3, such as to assist in managing communications between multiple computing nodes across one or more intermediate networks, including to manage communications so as to support pools of multiple related computing nodes of virtual computer networks, as well as to perform other types of management operations in some situations. In at least some embodiments, the routine may be provided as part of a system that manages communications for multiple different entities across a common intermediate network, with the communications configured so as to enable each computing node to transparently communicate with other associated computing nodes using a private virtual computer network that is specific to that entity. Furthermore, the routine may facilitate preventing unauthorized communications from being provided to destination computing nodes, such as by assisting Communication Manager modules with determinations of whether communications are authorized.

In the illustrated embodiment, the routine begins at block 405, where a request is received. The routine continues to block 410 to determine the type of request. If it is determined that the type of request is to associate one or more computing nodes with a particular indicated entity and/or virtual computer network of an entity, such as if those computing nodes are to be part of the virtual computer network for the entity (e.g., are executing or are to execute one or more programs on behalf of that entity), the routine continues to block 415 to associate those computing nodes with that indicated entity and virtual computer network. In some embodiments, the routine may further determine the one or more computing nodes to be associated with the indicated entity and virtual computer network, such as based on information provided by the indicated entity, while in other embodiments the selection of such computing nodes and/or execution of appropriate programs on those computing nodes may be performed in other ways. In addition, as discussed in greater detail elsewhere, in some embodiments one or more of the computing nodes may each be a virtual machine that is hosted by one or more physical computing systems. The routine then continues to block 420 to store an indication of the computing node(s) and their association with the indicated entity and virtual computer network. In particular, in the illustrated embodiment the routine stores an indication of a physical substrate network address corresponding to the computing node, a virtual network address used by the entity for the computing node as part of the virtual computer network, optionally a virtual hardware address assigned to the computing node, and an indication of the associated entity. As discussed in greater detail elsewhere, the physical substrate network address corresponding to the computing node may in some embodiments be a substrate network address specific to that single computing node, while in other embodiments may instead refer to a sub-network or other group of multiple computing nodes, such as may be managed by an associated Communication Manager module.

In addition, as discussed in greater detail elsewhere, the virtual network address corresponding to the computing node may in some embodiments be associated with a pool of multiple related computing nodes, such as multiple computing nodes that share the virtual network address and are alternative destinations for communications sent to the virtual network address. Furthermore, in at least some embodiments, the association of a particular computing node with a particular pool may be configured or otherwise specified by a user or other entity associated with the virtual computer network. Accordingly, the routine next continues to block 422 to optionally determine if the computing node is associated with a pool, such as based on an explicit indication of pool membership that is provided in configuration information for the computing node, or instead based on the computing node having an associated virtual network address that has been identified as corresponding to a pool (e.g., based on one or more computing nodes of the virtual computer network having been previously assigned the virtual network address associated with the current computing node). If so, information about the association of the computing node with the pool is stored for later use. In other embodiments, the determination of whether computing nodes are part of a pool may instead be performed at other times, such as by automatically detecting pools of multiple related computing nodes based on use of the computing nodes as part of the virtual computer network (e.g., based on communications sent by the computing nodes).

If it is instead determined in block 410 that the type of received request is a request for address resolution for a virtual network address of a computing node or other network device, such as from a communication manager module on behalf of a managed computing node, the routine continues instead to block 425, where it determines whether the request is authorized in one or more ways, such as based on whether the managed computing node on whose behalf the request is made is authorized to send communications to a computing node whose virtual network address resolution is requested (e.g., based on the virtual computer network(s) to which the two computing nodes belong), based on whether the managed computing node on whose behalf the request is made is a valid computing node that is currently part of a configured virtual computer network, and/or based on whether the request is received from the communication manager module that actually manages the indicated computing node on whose behalf the request is made. If the request is determined to be authorized, the routine continues to block 430, where it obtains a virtual network address of interest for a particular virtual computer network, such as may be identified based on an obtained entity network identifier for the virtual computer network or other indicator of the entity associated with the virtual computer network (e.g., a unique numeric or alphanumeric label), such as included with the request received in block 405.

The routine then continues to block 433 to determine whether the obtained virtual network address has been previously identified as being associated with a pool of multiple related computing nodes for the virtual computer network. If so, the routine continues to block 450 to retrieve stored information for the node pool, such as indications of the multiple related computing nodes that are part of the pool, and optionally information about how to select one or more particular computing nodes from the pool for a received request. The routine then selects one or more of the pool computing nodes for the received request, and retrieves information corresponding to each of the selected computing node(s), such as a physical substrate network address for a network location that corresponds to the computing node, and optionally other information for the computing node (e.g., an associated virtual hardware address). After block 450, the routine continues to block 455 to provide an indication of the retrieved information to the requester. In embodiments in which multiple computing nodes are selected, the routine may also optionally provide additional information for use by the requester in selecting between the multiple computing nodes, such as a ranking of the multiple computing nodes according to one or more measures of interest. For example, if a subset of the multiple computing nodes of the pool are selected based on those nodes' utilization rates, ranking information may be provided to show which of the subset is the least utilized, which is the second least utilized, etc., such as ordinal ranking numbers or instead actual current utilization rates. In some embodiments, information about all of the computing nodes of the pool may be provided in at least some situations.

If it is instead determined in block 433 that the virtual network address is not associated with a pool, the routine continue instead to block 435 to retrieve stored information for the computing node that is associated with the virtual network address for the virtual computer network, and in particular to information that associates that virtual network address to a physical substrate network address for a network location that corresponds to the computing node, such as may be previously stored with respect to block 420, and optionally to other information for the computing node (e.g., an associated virtual hardware address). After block 435, the routine continues to 440 to provide an indication of the retrieved information to the requester. While not illustrated here, if the determination in block 425 determines that the request is not authorized, the routine may instead not perform blocks 430-455 for that request, such as by responding with an error message to the request received in block 405 or not responding to that received request. In addition, in other embodiments the routine may perform one or more other tests to validate a received request before responding with the requested information, such as to verify that the computing node that initiated the request is authorized to receive that information.

If it is instead determined in block 410 that the received request is to monitor the status of one or more computing node pools for an indicated virtual computer network, the routine continues to block 470 to determine current status of the computing nodes of each of the pools. The request that initiates the monitoring may be initiated in various manners, such as from a user associated with that virtual computer network, based on an automated determination to do monitoring (e.g., periodically, in response to a determination that one or more criteria associated with triggering the monitoring are satisfied, etc.), from a communication manager module for current status information for a particular pool, etc. In addition, the determination of the current status may be performed in various manners in various embodiments, such as to send messages to or otherwise interact with the computing nodes of the pool (e.g., to send ping messages to determine if the nodes are alive, to request current status information of various types from the computing nodes, etc.), or to instead interact with one or more Communication Manager modules associated with the computing nodes to obtain similar information (e.g., after the Communication Manager modules interact with the computing nodes on behalf of the System Manager module, based on information previously tracked and stored by the Communication Manager modules, etc.). In other embodiments in which computing nodes and/or Communication Manager modules proactively push or otherwise provide status information to the System Manager module, such as periodically, the routine in block 470 may instead retrieve stored information that was recently received for the computing nodes of the pool(s). After block 470, the routine continues to block 475 to update stored status information for the pool(s) to reflect the determined current information, and in block 480 optionally notifies a user or other entity associated with the virtual computer network(s) for the indicated pool(s) of particular types of status information, such as if the request in block 405 was from the user for status information, or if the determined current information satisfies one or more criteria previously specified by the user. The one or more criteria may include, for example, that one or more pool computing nodes has failed or otherwise become unavailable.

If it is instead determined in block 410 that the received request is of another type, the routine continues instead to block 485 to perform another indicated operation as appropriate. For example, in some embodiments, the routine may receive requests to update stored information about particular computing nodes, such as if a particular computing node was previously associated with a particular entity and/or virtual computer network but that association ends (e.g., one or more programs being executed for that entity on that computing node are terminated, the computing node fails or otherwise becomes unavailable, etc.). In some embodiments, the routine may receive status information for computing nodes of node pools, such as may be proactively sent by the computing nodes and/or the nodes' associated communication manager modules, or instead responses to previous requests sent by the routine (e.g., with respect to block 470)—if so, such status information may be stored in block 485 for later use, such as with respect to block 470. The routine may also perform a variety of other actions related to managing a system of multiple computing nodes, as discussed in greater detail elsewhere, including automatically determining to analyze information about computing nodes of the virtual computer networks, such as to automatically detect pools of multiple related computing nodes (or to identify additional computing nodes for existing pools) based on actions of those computing nodes, such as communications sent by the computing nodes, and to store corresponding information for later use. In addition, while not illustrated here, in other embodiments the routine may at times perform actions of other types, such as to perform occasional housekeeping operations to review and update stored information as appropriate, such as after predefined periods of time have expired. In addition, if possible validation problems are detected, such as with respect to received address resolution requests for virtual network addresses, the routine may take various actions to signal an error and/or perform other corresponding actions as appropriate.

After blocks 422, 440, 455, 480 and 485, the routine continues to block 495 to determine whether to continue, such as until an explicit indication to terminate is received. If it is determined to continue, the routine returns to block 405, and if not continues to block 499 and ends.

Figure 5A:
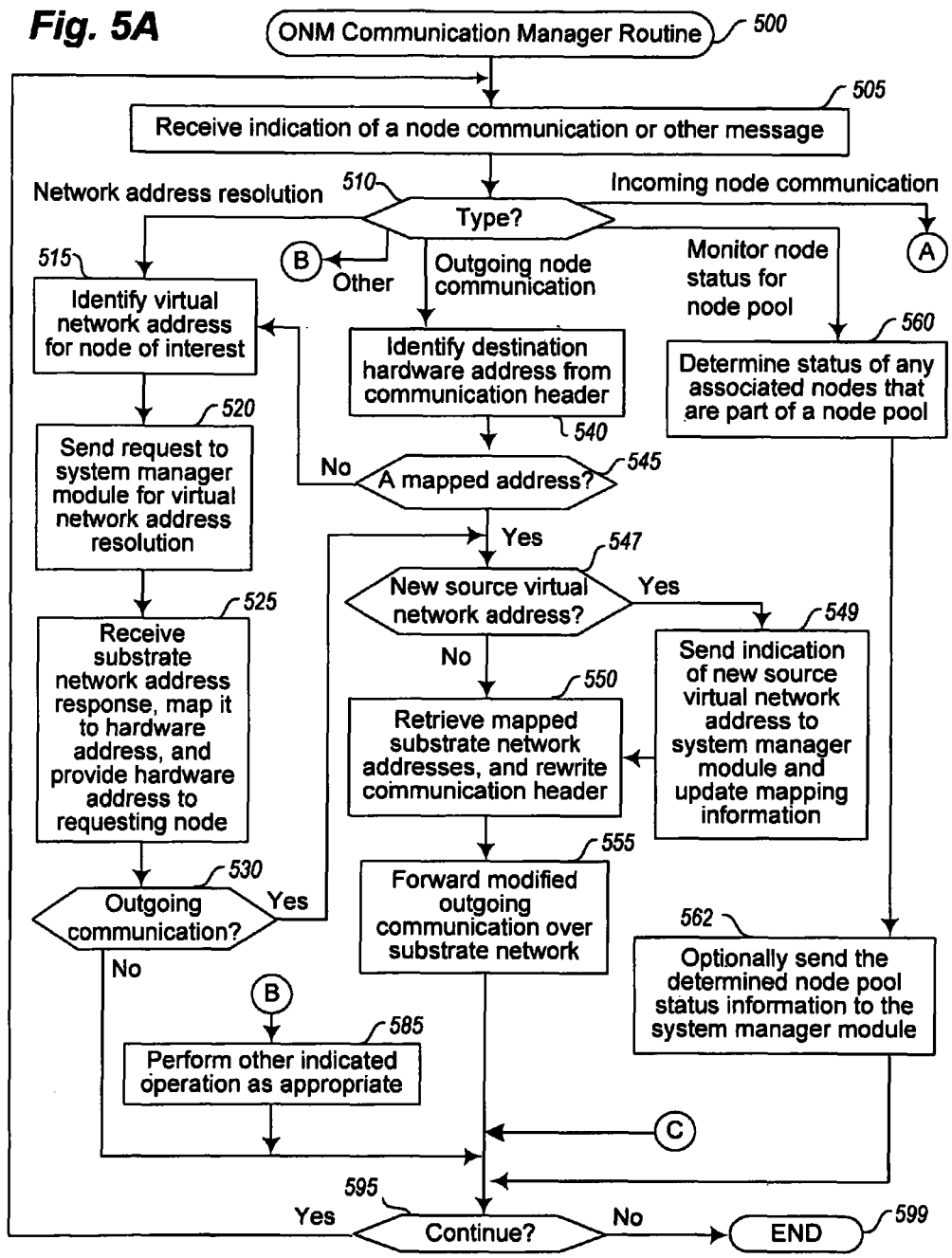
FIGS. 5A-5B illustrate a flow diagram of an example embodiment of an ONM Communication Manager routine.
Figure 5B:
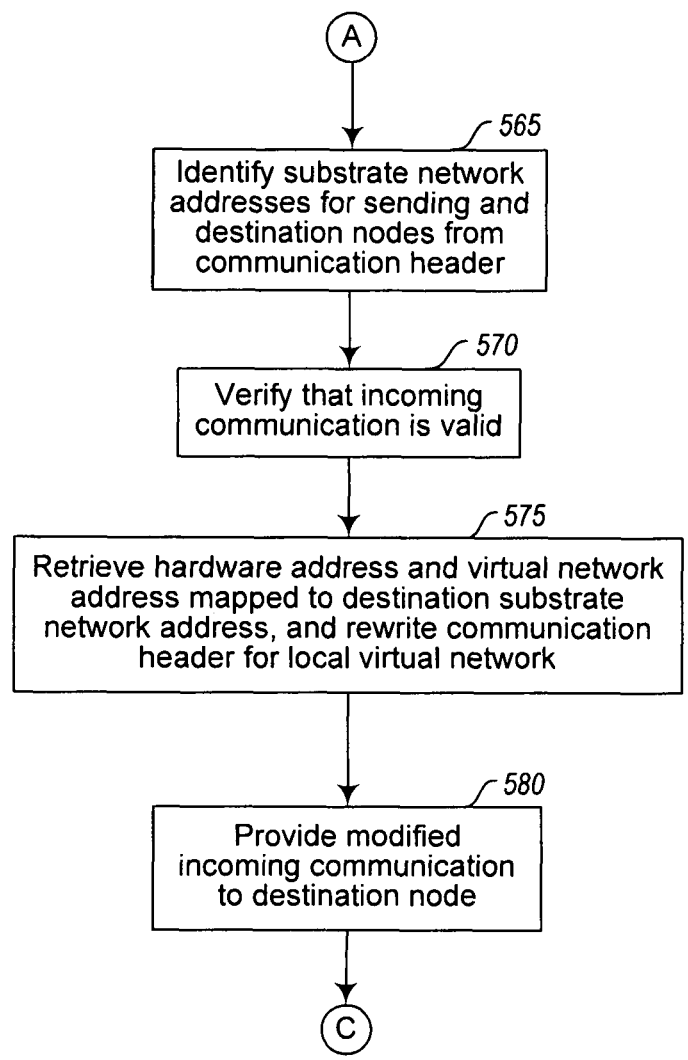

FIGS. 5A-5B are a flow diagram of an example embodiment of an ONM Communication Manager routine 500. The routine may be provided by, for example, execution of the Communication Manager modules 109a, 109b, 109c, 109d and/or 150 of FIG. 1, the Communication Manager modules 210, 215 and/or 260 of FIGS. 2A-2C, and/or the Communication Manager modules 356 and/or 360 of FIG. 3, such as to manage communications to and from an associated group of one or more computing nodes in order to provide a private virtual computer network over one or more shared intermediate networks, including to determine whether to authorize communications to and/or from the managed computing nodes, and to support pools of multiple related computing nodes for virtual computer networks of the managed computing nodes.

The routine begins at block 505, where an indication is received of a node communication or other message. The routine continues to block 510 to determine the type of communication or other message and proceed accordingly. If it is determined in block 510 that the message is a request from an associated managed computing node for network address resolution, such as an ARP request, the routine continues to block 515 to identify the virtual network address of interest indicated in the request. The routine then continues to block 520 to send a request to a system manager module for virtual network address resolution for the indicated virtual network address for the virtual computer network associated with the computing node that provided the request, such as discussed with respect to blocks 425-455 of FIGS. 4A-4B. As discussed in greater detail elsewhere, the routine may in some embodiments track information about virtual computer networks and/or entities associated with each managed computing node, as well as about remote computing nodes associated with particular virtual network addresses for particular virtual computer networks, while in other embodiments at least some such information may instead be provided to the routine by the computing nodes and/or by the system manager module, or instead the system manager module may track and store that information without it being provided to and tracked by the current routine. While not illustrated here, in other embodiments and situations such address resolution requests may be handled in other manners. For example, if a computing node being managed by a particular communication manager module provides an address resolution request for another computing node that is also managed by that communication manager module, the routine may instead respond to the request without interaction with the system manager module, such as based on locally stored information. In addition, while in the illustrated embodiment the received request is a request to provide a computing node's link-layer hardware address that corresponds to an indicated networking layer address, in other embodiments the address resolution request may have other forms, or computing nodes may request other types of information about computing nodes that have indicated virtual network addresses.

In the illustrated embodiment, the routine next continues to block 525 to receive a response from the system manager module that includes a physical substrate network address and/or other information corresponding to the identified virtual network address, and stores information locally that maps that physical substrate network address and/or other information to a unique hardware address for later use by the routine (e.g., based on a dummy virtual hardware address generated by the routine or provided in the response). The routine then provides the hardware address to the requesting computing node, which it will use as part of communications that it sends to the computing node with the indicated virtual network address. As discussed in greater detail elsewhere, the physical substrate network address response that is provided may in some embodiments include a physical substrate network address that is specific to the indicated computing node of interest, while in other embodiments the physical substrate network address may correspond to a sub-network or other group of multiple computing nodes to which the indicated computing node belongs, such as to correspond to another communication manager module that manages those other computing nodes.

Furthermore, when the indicated virtual network address corresponds to a node pool, the information received in block 525 may include various types of additional information, such as indications of multiple computing nodes that are selected to correspond to the indicated virtual network address, and optionally information that indicates a ranking of the multiple indicated computing nodes or that may otherwise be used by the communication manager module to select a particular one of the multiple indicated computing nodes at a particular time. As one illustrative example, the information returned may include a ranked list of multiple indicated computing nodes, such that the communication manager module uses the highest ranked computing node until it becomes unavailable, or instead for a specified amount of time or specified number of communications (e.g., 1, 10, 100, 1000, etc.). If so, when the highest ranked computing node becomes unavailable or other indicated criteria is satisfied (e.g., a specified number of communications are sent), the second highest ranked computing node is used in a similar manner (e.g., until it becomes unavailable, for the specified amount of time, for the specified number of communications, etc.), and so on. Furthermore, the system manager module may in some embodiments indicate that the one or more computing nodes specified in the response message are part of a node pool, while in other embodiments may not indicate that a single pool computing node that is selected is part of a node pool.

The routine then continues to block 530 to determine if blocks 515-525 were performed as part of the handling of an outgoing node communication, as discussed with respect to blocks 540-555, and if so, continues to block 547. While not illustrated here, in some embodiments the routine may instead receive an error response from the system manager module (e.g., based on the requesting computing node not being authorized to communicate with the indicated destination computing node) or no response, and if so may not send any response to the requesting computing node or may send a corresponding error message to that computing node.

If it is instead determined in block 510 that the type of communication or other message is an outgoing node communication from a computing node managed by the routine to another indicated remote destination computing node that is not managed by the routine, the routine continues to block 540 to identify the indicated hardware address for the destination computing node from the communication header. In block 545, the routine then determines whether that destination hardware address is a hardware address previously mapped to a physical substrate network address corresponding to the destination computing node (or possibly to physical substrate network addresses for multiple computing nodes if the destination hardware address corresponds to a node pool for which multiple computing nodes were selected), such as previously discussed with respect to block 525. If not, in some embodiments the routine continues to block 515 to perform blocks 515-525 to determine such a corresponding physical network address for the outgoing node communication, while in other embodiments such actions are not performed (e.g., if the indicated hardware address is not a mapped address, the routine may cause the outgoing node communication to fail, such as with an error message back to the sending node).

If the indicated hardware address is a mapped address, or the check is not performed, the routine continues to block 550 to retrieve the physical substrate network address that is mapped to the hardware address, or to retrieve information about multiple such mapped physical substrate network addresses and to select one of them in a configured or predefined manner as discussed in greater detail elsewhere. In block 555, the routine then rewrites the communication header in accordance with a networking address protocol for one or more intermediate networks between the sending and destination computing nodes using the physical substrate network address retrieved or determined in block 550. The header re-writing may further include changing other information in the new header, including changing a virtual network address for the sending computing node to be a corresponding physical substrate network address, and in at least some embodiments includes modifying the received communication without encapsulation as part of an overlay of the virtual computer network over the substrate one or more intermediate physical networks. In block 555, the routine then facilitates providing of the modified outgoing communication to the destination computing node, such as by initiating forwarding of the modified outgoing communication over the substrate intermediate network(s) to the destination computing node. While not illustrated here, in other embodiments various additional types of processing may be performed for outgoing node communications, such as to verify that the communications are valid or otherwise authorized in various ways (e.g., to verify that the sending computing node is authorized to send communications to the destination computing node, such as based on being associated with the same entity or part of the same virtual computer network, based on the sending and destination computing nodes being associated with different entities that are authorized to inter-communicate, based on the type of communication or other information specific to the communication, etc.).

If it is instead determined in block 510 that the received message is an incoming node communication for one of the managed computing nodes from an external computing node, the routine continues to block 565 to identify the physical substrate network addresses for the sending and destination computing nodes from the communication header. After block 565, the routine continues to block 570 to optionally verify that the incoming communication is valid in one or more ways. For example, the routine may determine whether the physical substrate network address for the sending communication node is actually mapped to a computing node that corresponds to the source physical substrate network address location, such as based on interactions with a system manager module and/or based on other information previously obtained and stored by the routine. In addition, the routine may determine whether the physical substrate network address for the destination communication node corresponds to an actual managed computing node. While not illustrated here, if an incoming communication is determined to not be valid, the routine may take various actions not shown, such as to generate one or more errors and perform associated processing and/or drop the incoming communication without forwarding it to the indicated destination node. For example, if the incoming communication indicates a destination network address that does not correspond to a current managed computing node, the routine may drop the incoming communication and/or initiate an error message, although in some embodiments such error messages are not sent to the sending computing node, or other actions may be taken to support forwarding communications to a moved computing node that was previously supported by the routine.

In the illustrated embodiment, after block 570, the routine continues to block 575 to retrieve the hardware address and the virtual network address that are mapped to the physical destination substrate network address, and to rewrite the communication header for the virtual computer network so that it appears to be sent to a computing node with that virtual network address and hardware address. For example, in some embodiments the destination virtual network address may be obtained from the destination physical substrate network address itself, such as from a subset of the bits of the destination physical substrate network address. In addition, the destination hardware address may have previously been mapped to the physical destination substrate network address, such as previously discussed with respect to block 525. In situations in which such prior mapping has not occurred, the routine may instead perform blocks 515-525 to obtain such information. The routine may similarly rewrite the communication header for the virtual computer network so that it appears to be sent from a computing node with a source virtual network address and source hardware address corresponding to the sending computing node. After block 575, the routine continues to block 580 to facilitate providing of the modified incoming communication to the destination computing node, such as by initiating forwarding of the modified incoming communication to the destination node.

If it is instead determined in block 510 that the received message is a request or indication to monitor the status of one or more managed computing nodes of one or more node pools, the routine continues to block 560 to determine the status information, and in block 562 optionally sends the status information to the system manager module and/or stores the status information for later use, and may further send the determined status information to a requester that sent the received message if from a requester other than the system manager module. The received request or indication may have various sources in various embodiments, such as the following non-exclusive list: a request from a system manager module to provide status information for one or more managed computing nodes; an automated determination to monitor status information for managed computing nodes in node pools periodically or when specified triggering criteria occur; a request from a remote computing node of a node pool to provide status information for one or more managed computing nodes; etc. In other embodiments, if computing nodes of a pool determine to obtain status information about other computing nodes of the pool, the computing nodes may instead use standard communications between the computing nodes to obtain that information, rather than to initiate messages that will be managed by associated communication manager modules in the described manner. In addition, the determination of the status information for managed computing nodes may be performed in various manners, such as to retrieve stored information about the status of the computing node that was previously tracked (e.g., the time of the last communication sent by the computing node), or to send one or more messages to the computing node or perform other interactions to determine a current status of the computing node (e.g., if the computing node is a virtual machine and the communication manager module is part of a virtual machine hypervisor, to retrieve privileged operating system-level information about the virtual machine computing node).

If it is instead determined in block 510 that a message of another type is received, the routine continues to block 585 to perform another indicated operation as appropriate, such as to store information about entities associated with particular computing nodes, update previously mapped or stored information to reflect changes with respect to computing nodes that are being managed or to remote computing nodes, etc. In addition, in some embodiments information about computing nodes of node pools may be tracked or updated at various times, such as when the computing nodes send communications or take other actions.

After blocks 555, 562, 580, or 585, or if it is instead determined in block 530 that the processing is not being performed with respect to an outgoing communication, the routine continues to block 595 to determine whether to continue, such as until an explicit indication to terminate is received. If it is determined to continue, the routine returns to block 505, and if not continues to block 599 and ends.

In addition, various embodiments may provide mechanisms for customer users and other entities to interact with an embodiment of the system manager module for purpose of configuring computing nodes and their communications. For example, some embodiments may provide an interactive console (e.g. a client application program providing an interactive user interface, a Web browser-based interface, etc.) from which users can manage the creation or deletion of virtual computer networks, and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In some such embodiments, users may further monitor the status of pools of computing nodes for their virtual computer networks, such as by dynamically requesting and receiving current status information about the node pools, or by reviewing recent or historical information about the node pools. In some embodiments, some or all of the functionality of an embodiment of the ONM system may be provided in exchange for fees from users or other entities, and if so the mechanisms for customer users and other entities to interact with an embodiment of the system manager module may include mechanisms for users and other entities to provide payment and payment-related information, as well as to monitor corresponding payment information. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services. Additional details related to the operation of example embodiments of a program execution service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" U.S. application Ser. No. 11/692,038, filed Mar. 27, 2007 and entitled "Configuring Intercommunications Between Computing Nodes;" and U.S. application Ser. No. 12/332,214, filed Dec. 10, 2008 and entitled "Providing Access To Configurable Private Computer Networks;" each of which is incorporated herein by reference in its entirety. In addition, additional details related to the management of provided virtual networks that may be used by at least some embodiments of an ONM system are available in U.S. application Ser. No. 12/060,074, filed Mar. 31, 2008 and entitled "Configuring Communications Between Computing Nodes;" which is also incorporated herein by reference in its entirety.

It will also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-component application (e.g., a multi-tiered business application) may in some embodiments use the described techniques to provide functional decomposition and/or isolation for the various component types (e.g., Web front-ends, database servers, business rules engines, etc.). More generally, the described techniques may be used to virtualize physical networks to reflect almost any situation that would conventionally necessitate physical partitioning of distinct computing systems and/or networks.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for managing a network, the method comprising:

receiving, by one or more computing systems, communications sent between a plurality of computing nodes of a virtual computer network that is overlaid on a substrate network interconnecting the plurality of computing nodes, each of the communications being directed to one of multiple virtual Internet Protocol (IP) addresses for the virtual computer network, each of the plurality of computing nodes having an associated substrate network address for the substrate network;

forwarding, by the one or more computing systems and for each of the received communications, the received communication to a destination one of the plurality of computing nodes that is identified by the one virtual IP address to which the received communication is directed, the forwarding using the associated substrate network address for the destination one computing node;

assigning, by a system manager computing system configured to manage operations of the virtual computer network, a first of the multiple virtual IP addresses to a pool of multiple of the plurality of computing nodes that are alternative destinations for communications sent to the first virtual IP address;

selecting, by the system manager computing system and for a first of the plurality of computing nodes, a second computing node to associate with the first virtual IP address for future communications sent by the first computing node to the first virtual IP address, the second computing node being one of the multiple computing nodes of the pool and being associated with a second substrate network address; and after the selecting of the second computing node to associate with the first virtual IP address for future communications sent by the first computing node to the first virtual IP address, receiving, by the one or more configured computing systems, one or more communications sent by the first computing node to the first IP address; and forwarding each of the one or more communications to the second computing node using the second substrate network address.

2. The method of claim 1 further comprising, after the selecting of the second computing node to associate with the first virtual IP address for communications sent by the first computing node, and before the receiving of the one or more communications sent by the first computing node to the first IP address, configuring the one or more computing systems to associate the first IP address with the second substrate network address for the first computing node.

3. The method of claim 1 wherein the selecting of the second computing node to associate with the first virtual IP address for communications sent by the first computing node is initiated by an address resolution request sent from the first computing node for the first virtual IP address.

4. The method of claim 2 further comprising:

selecting, by the system manager computing system, a fourth computing node to associate with the first virtual IP address for communications sent by a third of the plurality of computing nodes, wherein the multiple computing nodes of the pool include the fourth computing node, and wherein the fourth computing node is associated with a third substrate network address;

configuring the one or more computing systems to associate the first IP address with the third substrate network address for the third computing node; and forwarding, by the one or more computing systems and for each of one or more additional communications sent by the third computing node to the first IP address, each of the additional communications to the fourth computing node using the third substrate network address.

5. The method of claim 1 wherein the substrate network is a physical network that includes multiple interconnected physical networking devices, and wherein the method further comprises sending information over the substrate network from the first computing node to the second computing node by sending the information to one of the physical networking devices of the substrate network so that the one physical networking device uses the second substrate network address to route the information to the location of the second computing node in the substrate network.

6. The method of claim 1 further comprising, after the selecting of the second computing node to associate with the first virtual IP address for communications sent by the first computing node, constructing a mapping accessible to the one or more computing systems that indicates, for each of at least some of the plurality of computing nodes, one of the multiple computing nodes of the pool to which the first IP address is mapped when that computing node directs communications to the first IP address.

7. The method of claim 1 further comprising automatically identifying the multiple computing nodes in the pool in response to determining that the multiple computing nodes each use the first virtual IP address.

8. The method of claim 1 wherein the assigning of the first virtual IP address to the pool of the multiple computing nodes is performed in response to a request to create the pool, and wherein the virtual computer network and the request to create the pool are associated with a user account.

9. The method of claim 1 wherein the first virtual IP address is associated with a network-accessible service that is available to at least some of the plurality of computing nodes of the virtual computer network.

10. The method of claim 1 wherein the selecting of the second computing node is based on at least one of information specific to the first computing node and information specific to the second computing node.

11. The method of claim 10 wherein the selecting of the second computing node is further based on at least one of the location of the second computing node in the substrate network relative to the location of the first computing node in the substrate network and a current level of ability of the second computing node to handle communications from the first computing node.

12. The method of claim 1 wherein the selecting of the second computing node is based at least in part on a monitored status of the second computing node.

13. The method of claim 1 further comprising sending status information for the multiple computing nodes of the pool to a computer associated with a user account, wherein the virtual computer network is associated with the user account.

14. The method of claim 1 wherein each of the plurality of computing nodes is a virtual machine hosted on one of multiple host physical computing systems, and wherein the multiple host physical computing systems are the one or more computing systems and each executes one of multiple communication manager modules configured to manage communications by the virtual machine computing nodes hosted on the host physical computing system.

15. The method of claim 4 wherein at least some of the plurality of computing nodes are virtual machines hosted on host physical computing systems, and wherein the second and fourth computing nodes are each virtual machines and are hosted on distinct host physical computing systems.

16. The method of claim 4 wherein the second and fourth computing nodes are each virtual machines that are hosted on a single host physical computing system.

17. The method of claim 1 further comprising:
receiving a request to send additional information by a fifth of the plurality of computing nodes to the first virtual IP address;
determining a subset of the computing nodes of the pool for use with the additional information; and
initiating sending of the additional information to each of the computing nodes of the determined subset.

18. The method of claim 1 further comprising:
receiving a request to send indicated information by a fifth of the plurality of computing nodes to the first virtual IP address; and
initiating sending of the indicated information to each of the computing nodes of the pool.

19. The method of claim 1 further comprising, after one of the computing nodes of the pool is determined to be unavailable, initiating adding another computing node to the pool.

20. The method of claim 1 further comprising, after one of the computing nodes of the pool is determined to satisfy one or more defined criteria related to a lack of ability of the one computing node to handle additional requests, automatically initiating adding another computing node to the pool.

21. A non-transitory computer-readable medium whose contents include instructions that when executed cause a computing system to perform a method, the method comprising:
receiving configuration information from a system manager module that manages operations of a first virtual computer network overlaid on a substrate network, the configuration information corresponding to multiple computing nodes that are alternative destinations for communications sent to a first virtual Internet Protocol (IP) address of the first virtual computer network, the multiple computing nodes including at least first and second computing nodes and being a subset of a plurality of computing nodes;
selecting the first computing node for use with a third computing node of the plurality of computing nodes based at least in part on the received configuration information, and associating the first virtual IP address with the first computing node for use with future outgoing communications sent by the third computing node to the first virtual IP address; and
selecting the second computing node for use with a fourth computing node of the plurality of computing nodes based at least in part on the received configuration information, and associating the first virtual IP address with the second computing node for use with future outgoing communications sent by the fourth computing node to the first virtual IP address;
after the associating of the first virtual IP address with the first computing node for outgoing communications sent by the third computing node, receiving one or more indications of one or more first outgoing communications sent by the third computing node to the first virtual IP address, and initiating forwarding of the one or more first outgoing communications to the first computing node over the substrate network using a first substrate network address of the first computing node; and
after the associating of the first virtual IP address with the second computing node for outgoing communications sent by the fourth computing node, receiving one or more indications of one or more second outgoing communications sent by the fourth computing node to the first virtual IP address, and initiating forwarding of the one or more second outgoing communications to the second computing node over the substrate network using a second substrate network address of the second computing node.

22. The non-transitory computer-readable medium of claim 21 wherein the multiple computing nodes are part of an identified pool of alternative destinations associated with the first virtual IP address, and wherein the associating of the first virtual IP address with the second computing node for outgoing communications sent from the first computing node includes:
selecting the second computing node from the identified pool based on at least one of information specific to the first computing node and of information specific to the second computing node; and
mapping the first substrate network address of the second computing node with the first virtual IP address for the first computing node.

23. The non-transitory computer-readable medium of claim 21 wherein the computer-readable medium is a memory of the configured computing system on which the contents are stored.

24. A system configured to manage network communications having multiple alternative destinations, comprising:
one or more processors of one or more computing systems; and
a system manager module that is configured to, when executed by at least one of the one or more processors, automatically facilitate communications between a plurality of computing nodes of a virtual computer network that is overlaid on one or more other networks that interconnect the plurality of computing nodes, by:
receiving information about multiple of the plurality of computing nodes that are alternative destinations for receiving communications sent to a first virtual Internet Protocol (IP) address by other of the plurality of computing nodes, the multiple computing nodes including at least first and second computing nodes;
configuring first information for use in forwarding future communications sent by a third of the plurality of computing nodes to the first virtual IP address, the configuring of the first information including selecting the first computing node to associate with the first virtual IP address for use with those future communications sent by the third computing node;
configuring second information for use in forwarding future communications sent by a fourth of the plurality of computing nodes to the first virtual IP address, the configuring of the second information including selecting the second computing node to associate with the first virtual IP address for use with those future communications sent by the fourth computing node; and
after the configuring of the first and second information, initiating, for one or more first communications that are sent by the third computing node to the first IP address, forwarding of the one or more first communications to the first computing node based at least in part on the configured first information; and
initiating, for one or more second communications that are sent by the fourth computing node to the first IP address, forwarding of the one or more second communications to the second computing node based at least in part on the configured second information.

25. The system of claim 24 wherein the selecting of the first computing node to associate with the first virtual IP address for use with future communications sent by the third computing node is based on at least one of a group including information specific to the third computing node and information specific to the first computing node.

26. The system of claim 24 wherein the one or more other networks are a physical substrate network, wherein the first virtual IP address is specified for the virtual computer network, and wherein the system further comprises a first communication manager module that stores mapping information for the third computing node based at least in part on the configured first information and that performs the forwarding of the one or more first communications based on the stored mapping information.

27. The system of claim 26 further comprising a first computing system that executes the first communication manager module and a second computing system that executes the system manager module, the first computing system hosting multiple virtual machines that each provide one of the plurality of computing nodes and executing the first communication manager module as part of a virtual machine manager module for the first computing system, and the third computing node being one of the computing nodes provided by the hosted multiple virtual machines.

28. The system of claim 24 wherein the system manager module includes software instructions for execution by the at least one processors of the one or more computing systems.

29. The system of claim 24 wherein the system manager module consists of a means for automatically facilitating the communications between the plurality of computing nodes of the virtual computer network.

\* \* \* \* \*

UNITED STATES PATENT AND TRADEMARK OFFICE
CERTIFICATE OF CORRECTION

PATENT NO.        : 8,595,378 B1                                   Page 1 of 1
APPLICATION NO.   : 12/414253
DATED             : November 26, 2013
INVENTOR(S)       : Daniel T. Cohn et al.

It is certified that error appears in the above-identified patent and that said Letters Patent is hereby corrected as shown below:

On the Title Page

Item (56):
"Clark, C., et al. "Live Migration of Virtual Machines," retrieved on March 16, 2009, from http://www.cl.cam.ac.uk/research/srg/netos/pa-pers/2005-migration-nsdi-pre.pdf, 14 pages." should read, --Clark, C., et al. "Live Migration of Virtual Machines," retrieved on March 16, 2009, from http://www.cl.cam.ac.uk/research/srg/netos/papers/2005-migration-nsdi-pre.pdf, 14 pages.--.

Signed and Sealed this
Twenty-fourth Day of June, 2014

Michelle K. Lee
*Deputy Director of the United States Patent and Trademark Office*